United States Patent
Jacob et al.

(10) Patent No.: US 9,424,639 B2
(45) Date of Patent: Aug. 23, 2016

(54) METHOD OF ASSESSING HETEROGENEITY IN IMAGES

(71) Applicants: Richard E. Jacob, Kennewick, WA (US); James P. Carson, Austin, TX (US)

(72) Inventors: Richard E. Jacob, Kennewick, WA (US); James P. Carson, Austin, TX (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 111 days.

(21) Appl. No.: 14/166,601

(22) Filed: Jan. 28, 2014

(65) Prior Publication Data

US 2014/0307932 A1   Oct. 16, 2014

Related U.S. Application Data

(60) Provisional application No. 61/810,516, filed on Apr. 10, 2013.

(51) Int. Cl.
  *G06T 7/00* (2006.01)

(52) U.S. Cl.
  CPC ..... *G06T 7/0012* (2013.01); *G06T 2207/20016* (2013.01); *G06T 2207/30061* (2013.01)

(58) Field of Classification Search
  None
  See application file for complete search history.

(56) References Cited

U.S. PATENT DOCUMENTS

2008/0130825 A1\* 6/2008 Fu et al. .......................... 378/8
2009/0080743 A1\* 3/2009 Launay et al. ............... 382/131
2009/0324049 A1\* 12/2009 Kontos et al. ................ 382/132
2010/0080430 A1\* 4/2010 Souza et al. ................. 382/131
2014/0233820 A1\* 8/2014 Wu et al. ...................... 382/131

OTHER PUBLICATIONS

Rambally et al. "Octrees and Their Applications in Image Processing." Proceedings, IEEE Southeastcon '90, vol. 3, Apr. 1990, pp. 1116-1120.\*
Marschallinger et al. "Multiple Sclerosis: a Multidisciplinary Approach to the Analysis, 4D Modeling and Spatiotemporal Simulation of Lesion Pattern Evolution." SEECCM 2009, 2nd South-East European Conference on Computational Mechanics, an IACM-EC-COMAS Special Interest Conference, Jun. 22, 2009, 11 pages.\*
Mets, O.M., et al., Quantitative Computed Tomography in COPD: Possibilities and Limitations, Lung, 190, 2012, 133-145.
Robertson, H. T., et al., Imaging for lung physiology: What do we wish we could measure?, J Appl Physiol, 113, 2012, 317-327.
Pauwels, R. A., et al., Global Strategy for the Diagnosis, Management, and Prevention of Chronic Obstructive Pulmonary Disease, A. J. Respir Crit Care Med, 135, 5, 2001, 1256-1276.
Kohler, D., et al., Usefulness of GOLD classification of COPD severity, Thorax, 58, 2003, 825-828.
Pescarolo, M., et al., How much do GOLD stages reflect CT abnormalities in COPD patients?, Radiol Med, 113, 2008, 817-829.
Litmanovich, D., et al., CT of pulmonary emphysema—current status, challenges, and future directions, Eur Radiol, 19, 2009, 537-551.

(Continued)

*Primary Examiner* — Jon Chang
(74) *Attorney, Agent, or Firm* — Derek H. Maughan

(57) ABSTRACT

A method of assessing heterogeneity in images is disclosed. 3D images of an object are acquired. The acquired images may be filtered and masked. Iterative decomposition is performed on the masked images to obtain image subdivisions that are relatively homogeneous. Comparative analysis, such as variogram analysis or correlogram analysis, is performed of the decomposed images to determine spatial relationships between regions of the images that are relatively homogeneous.

12 Claims, 18 Drawing Sheets

(56) References Cited

OTHER PUBLICATIONS

Chong, D., et al., Reproducibility of volume and densitometric measures of emphysema on repeat computed tomography with an interval of 1 week, Eur Radiol, 22, 2012, 287-294.
Uppaluri, R., et al., Quantification of Pulmonary Emphysema from Lung Computed Tomography Images, Am J. Respir Crit Care Med, 156, 1997, 248-254.
Besir, F. H., et al., The benefit of expiratory-phase quantitative CT densitometry in the early diagnosis of chronic obstructive diagnosis of chronic obstructive pulmonary disease, Daign Interv Radiol, 18, 3, 2012, 248-254.
Irion, K. L., et al., CT Quantification of Emphysema in Young Subjects with no Recognizable Chest Disease, AJR Am J Roentgenol, 192, 3, 2009, 90-96.
Reske, A. W., et al., Image reconstruction affects computer tomographic assessment of lung hyperinflation, Intensive Care Med, 34, 11, 2008, 2044-2053.
Yuan, R., et al., The Effects of Radiation Dose and CT Manufacturer on Measurements of Lung Densimetry, Chest, 132, 2, 2007, 617-623.
Chae, E. J., et al., Slope of Emphysema Index: An Objective Descriptor of Regional Heterogeneity of Emphysema and an Independent Determinant of Pulmonary Function, AJR Am J Roengenol, 194, 3, 2010, 248-255.
Boehm, H. F., et al., Automated classification of normal and pathologic pulmonary tissue by topological texture features extracted from multi-detector CT in 3D, Eur Radiol, 18, 12, 2008, 2745-2755.
Xu, Y., et al., MDCT-Based 3-D Texture Classification of Emphysema and Early Smoking Related Lung Pathologies, IEEE Transactions Med Imaging, 25, 4, 2006, 464-475.
Hersh, C. P., et al., Interobserver Variability in the Determination of upper Lobe-Predominant Emphysema, Chest, 131, 2, 2007, 424-431.
Fain, S. B., et al., Early Emphysematous Changes in Asymptomatic Smokers: Detection with 3He MR Imagaing1, Radiology, 239, 3, 2006, 875-883.
Quirk, J. D., et al., In Vivo Detection of Acinar Microstructural Changes in Early Emphysema with 3He Lung Morphometry, Radiology, 260, 3, 2011, 866-874.
Alford, S. K., et al., eterogeneity of pulmonary perfusion as a mechanistic image-based phenotype in emphysema susceptible smokers, Proc Natl Acad Sci, USA, 107, 16, 2010, 7485-7490.
Melo, M. F. V., et al, Spatial Heterogeneity of Lung Perfusion Assessed with 13N PET as a Vascular Biomarker in Chronic Obstructive Pulmonary Disease, The Journal of Nuclear Medicine, 51, 2010, 57-65.
Vogt, B, et al., Spatial and temporal heterogeneity of regional lung ventilation determined by electrical impedance tomography during pulmonary function testing, J Appl Physiol, 113, 2012, 1154-1161.
Chang, C. C., et al., Fractal Feature Analysis and Classification in Medical Imaging, IEEE Trans Med Imaging, 8, 2, 1989, 133-142.
Glenny, R. W., et al., Fractal properties of pulmonary blood flow: characterization of spatial heterogeneity, J Appl Physiol, 69, 2, 1990, 532-545.
Kido, S., et al., Fractal Analysis of Interstitial Lung Abnormalities in Chest Radiography, Radiographics, 15, 6, 1995, 1457-1464.
Uppaluri, R., et al., Fractal analysis of high-resolution CT images as a tool for quantification of lung diseases, SPIE vol. 2433, 133-142.
Subramaniam, K., et al., Quantifying Tissue Heterogeneity using Quadtree Decomposition, 34th Annual Internation Conference of the IEEE EMBS, San Diego, CA, USA, 2012, 4079-4082.
Dua, S. ,et al., Region Quad-Tree Decomposition Based Edge Detection for Medical Images, The Open Medical Informatics Journal, 4, 2010, 50-57.
Gringarten, E., et al., Vaiogram Interpretation and Modeling, Math Geol, 33, 4, 2001, 507-534.
Keil, F., et al., Investigation of the spatial correlation in human white matter and the influence of age using 3-dimensional variography applied to MP-RAGE data, Neuroimage, 63, 2012, 1374-1383.
Jacob, R. E., et al., 3D 3He diffusion MRI as a loca in vivo morphometric tool to evaluate emphysematous rat lungs, J Appl Physiol, 105, 4, 2008, 1291-1300.
Jacob, R. E., et al., Stable Small Animal Ventilation for Dynamic Lung Imaging to Support Computational Fluid Dynamics Models, PLoS One 6, 11, 2011, e27577.
Corley, R. A., et al., Comparative Computational Modeling of Airflows and Vapor Dosimetry in the Respiratory Tracts of Rat, Monkey, and Human, Toxicological Sciences, 128, 2, 2012, 500-516.
Minard, K. R., et al., Phase-contrast MRI and CFD modeling of apparent 3He gas flow in rat pulmonary airways, Journal of Magnetic Resonance, 221, 2012, 129-138.
Hsia, C. C. W., et al., An Official Research Policy Statement of the American Thoracic Society/European Respiratory Society: Standards for Quantitative Assessment of Lung Structure, Am J. Respir Crit Care Med, 181, 4, 2010, 394-418.
Jacob, R. E., et al., Comparison of Two Quantitative Methods of Discerning Airspace Enlargement in Smoke-Exposed Mice, PLoS One, 4, 8, 2009, e6670.
Ward, E. R., et al., Proton and Hyperpolarized Helium Magnetic Resonance Imaging of Radiation-Induced Lung Injury in Rats, Int J Radiat Oncol Biol Phys, 58, 2004, 1562-1569.
Ward. H. E., et al., The Pulmonary Response to Sublethal Thoracic Irradiation in the Rat, Radiat Res, 136, 1993, 15-21.
Novakova-Jiresova, A., et al., Changes in Expression of Injury After Irradiation of Increasing Volumes in Rat Lung, Int J. Radiation Oncology Biol Phys., 67, 5, 2007, 1510-1518.
Yin, Y., MDCT-based dynamic, subject-specific lung models via image registration for CFD-based interrogation of regional lung function, Mechanical Engineering, vol. Ph.D., Iowa City, IA: University of Iowas, 2011.
Wiegman, E. M., et al., Loco-regional differences in pulmonary function and density after partial rat lung irradiation, Radiotherapy and Oncology, 59, 2003, 11-19.
Van Earde, M. R., et al., Comparison of three rat strains for development of radiation-induced lung injury after hemithoracic irradiation, Radiotherapy and Oncology, 58, 2001, 313-316.
Zhang, R., et al. Structural and functional alterations in the rat lung following whole thoracic irradiation with moderate doses: Injury and recovery, Int J Radiat Biol, 84, 2008, 487-497.
Pauluhn, J., et al., Rad model of lung fibrosis: comparison of functional, biochemical, and histopathological changes 4 months after single irradiation of the right hemithorax, Toxicology, 161, 2001, 153-163.
Calveley, V. L., et al., Partial volume rat lung irradiation : Temporal fluctuations of in-field and out-of-field DNA damage and inflammatory cytokines following irradiation, Int J Radiat Biol, 81, 2005, 887-899.
Kauczor, H. U., et al., CT attenuation of paired HRCT scans obtained at full inspiratory/expiratory position: comparison with pulmonary function tests, Eur Radiol, 12, 2002, 2757-2763.
Shephard, M. S., et al., Automatic Three-Dimensional Mesh Generation by the Finite Octree Technique, International Journal for Numerical Methods in Engineering, 32, 1991, 709-749.
International Search Report/Written Opinion for International Application No. PCT/US2014/013503, International Filing Date Jan. 29, 204, Date of Mailing Apr. 4, 2014.
Jacob, R. E., et al., Automated measurement of heterogeneity in CT images of healthy and diseased rat lungs using variogram and analysis of an octree decomposition, Medical Imaging, 14, 1, 2014.
Subramaniam, K., et al., Quantifying Tissue Heterogeneity using Quadtree Decomposition, 34th Annual International Conference of the IEEE EMBS, San Diego, California US, Aug. 28-Sep. 1, 2012, 4079-4082.

* cited by examiner

|  |  | 0 Gy | 6 Gy | 9 Gy | 12 Gy | 15 Gy |
|---|---|---|---|---|---|---|
| Physical measures | BW | 286 (9) | 279 (11) | 300 (10) | 289 (13) | 299 (14) |
|  | Water wt | 1.44 (0.18) | 1.41 (0.06) | 1.44 (0.14) | 1.36 (0.14) | 1.45 (0.07) |
|  | Dry wt | 0.302 (0.011) | 0.315 (0.010) | 0.306 (0.025) | 0.321 (0.016) | 0.327 (0.020) |
| Forced maneuvers | TLC | 24.6 (4.3) | 19.5 (2.2) | 24.1 (1.2) | 23.0 (1.2) | 23.4 (3.0) |
|  | FRC | 7.3 (1.3) | 5.7 (0.5) | 7.6 (1.4) | 6.3 (0.5) | 6.7 (1.2) |
|  | RV | 2.7 (1.5) | 2.5 (0.2) | 2.6 (1.2) | 2.7 (0.7) | 3.0 (0.5) |
|  | TLC/BW | 8.59 (1.31) | 6.95 (0.54) | 8.03 (0.46) | 7.97 (0.67) | 7.81 (0.90) |
|  | Cchord | 1.43 (0.27) | 1.10 (0.07) | 1.29 (0.11) | 1.26 (0.07) | 1.25 (0.18) |
|  | FEV20 | 2.5 (0.1) | 2.5 (0.2) | 2.4 (0.1) | 2.6 (0.2) | 2.4 (0.4) |
|  | FEV50 | 7.7 (0.3) | 7.6 (0.5) | 7.4 (0.3) | 7.9 (0.4) | 7.2 (1.1) |
|  | FEV100 | 15.5 (0.9) | 14.4 (1.1) | 14.8 (0.9) | 14.7 (0.7) | 13.7 (2.5) |
|  | FEV200 | 21.4 (2.4) | 17.7 (1.4) | 20.8 (2.3) | 19.3 (0.8) | 19.1 (2.8) |
|  | PEF | 178 (6) | 173 (12) | 170 (8) | 182 (9) | 165 (23) |
| Spontaneous breathing | BPM | 122 (10) | 136 (10) | 133 (12) | 119 (9) | 129 (19) |
|  | TV | 2.5 (0.3) | 2.3 (0.3) | 2.5 (0.2) | 2.1 (0.3) | 2.3 (0.2) |
|  | MV | 306 (62) | 318 (49) | 329 (44) | 256 (51) | 295 (61) |
| Ventilation | PIP | 5.1 (0.6) | 5.6 (0.1) | 4.9 (0.3) | 5.2 (0.3) | 5.1 (0.5) |
|  | EEP | 0.52 (0.11) | 0.42 (0.09) | 0.48 (0.09) | 0.46 (0.08) | 0.41 (0.07) |
|  | PIV | 2.13 (0.07) | 2.05 (0.10) | 2.15 (0.04) | 2.14 (0.07) | 2.12 (0.07) |
|  | Cave | 0.48 (0.08) | 0.41 (0.02) | 0.50 (0.03) | 0.46 (0.02) | 0.47 (0.05) |
| Imaging | HU (FRC) | -621 (30) | -554 (13) | -602 (35) | -588 (27) | -578 (41) |
|  | HU (PIP) | -684 (20) | -637 (9) | -668 (27) | -660 (21) | -653 (25) |
|  | CoV (FRC) | 0.076 (0.003) | 0.088 (0.005) | 0.079 (0.008) | 0.079 (0.004) | 0.083 (0.009) |
|  | CoV (PIP) | 0.069 (0.002) | 0.075 (0.002) | 0.069 (0.007) | 0.070 (0.003) | 0.072 (0.007) |
|  | Vol CoV | 0.60 (0.05) | 0.48 (0.03) | 0.52 (0.03) | 0.52 (0.06) | 0.50 (0.05) |

Figure 8

METHOD OF ASSESSING HETEROGENEITY IN IMAGES

CROSS-REFERENCE TO RELATED APPLICATIONS

This applications claims priority to U.S. Provisional Application Ser. No. 61/810,516, filed Apr. 10, 2013, titled "AUTOMATED MEASUREMENT OF HETEROGENEITY IN CT IMAGES OF HEALTHY AND DISEASED LUNGS USING VARIOGRAM ANALYSIS OF AN OCTREE DECOMPOSITION," hereby incorporated by reference in its entirety for all of its teachings.

STATEMENT REGARDING FEDERALLY SPONSORED RESEARCH OR DEVELOPMENT

The invention was made with Government support under Contract DE-AC05-76RLO1830, awarded by the U.S. Department of Energy. The Government has certain rights in the invention.

TECHNICAL FIELD

This invention relates to three-dimensional image analysis. More specifically, this invention relates to assessing heterogeneity in three-dimensional images using comparative analysis of decomposed images.

BACKGROUND OF THE INVENTION

Early detection of disease is generally associated with improved health outcomes. For example, in emphysema the Global initiative for Chronic Obstructive Lung Disease (GOLD) staging is a well-accepted approach for categorizing disease as mild, moderate, severe, or very severe (Pauwels et al. 2001). However, GOLD scores are global with no regional information. In addition, they are based only on spirometry and clinical presentation. Thus, GOLD is a helpful non-invasive starting point, but uncertainty about its diagnosis may warrant additional diagnostic procedures such as CT (computed tomography) imaging (Pauwels et al. 2001). Furthermore many diseases, such as emphysema, are heterogeneous diseases, and signatures of tissue heterogeneity may facilitate more accurate diagnoses. An image-based metric would be useful for detecting such heterogeneities.

SUMMARY OF THE INVENTION

The present invention is directed to methods of assessing heterogeneity in images. In one embodiment, a method of assessing heterogeneity in images is disclosed. The method includes acquiring 3D images of an object. The method also includes performing decomposition on the acquired images. The method further includes performing comparative analysis of the decomposed images using distance.

The method may further include masking and filtering the acquired images.

In one embodiment, performing decomposition on the acquired images includes performing iterative decomposition on the acquired images. Performing iterative decomposition on the masked images may include performing octree decomposition on the masked images, and performing octree decomposition on the masked images may include reducing the images to obtain image subdivisions that are relatively homogeneous. Reducing the images to obtain image subdivisions that are relatively homogeneous may include dividing boxes of the images according to a criterion. The criterion for dividing boxes of the images may include a measurement of standard deviation within each box and comparison of the standard deviation to a threshold standard. Each box may include location and mean value information.

In one embodiment, performing comparative analysis of the decomposed images using distance includes performing variogram analysis of the decomposed images. Performing variogram analysis may include calculating a square of the difference of the means between each box. The box may be, but is not limited to, an 8×8×8 voxel box. Calculating a square of the difference of the means between each box may include determining a spatial relationship between regions of the images that are relatively homogeneous.

The 3D image may be, but is not limited to, biological tissue.

In one embodiment, the images are reduced to homogeneous blocks of 2×2×2, 4×4×4, and 8×8×8 voxels.

In one embodiment, the threshold standard includes a Hounsfield Unit (HU) threshold.

The image are, but not limited to, at least one of the following: CT images, multi-dimensional images, ultrasound images, MRI images, data arrays, data matrix, data sets, pictures, multi-spectral images, and voxels of data generated using histograms.

In one embodiment, performing comparative analysis of the decomposed images using distance includes performing correlogram analysis of the decomposed images.

In another embodiment of the present invention, a method of assessing heterogeneity in images is disclosed. The method includes acquiring 3D images of an object; filtering the acquired images; masking the images; performing iterative decomposition on the masked images to obtain image subdivisions that are relatively homogeneous; and performing variogram analysis or correlogram analysis of the octree decomposed images to determine spatial relationships between the regions of the images that are relatively homogeneous.

BRIEF DESCRIPTION OF THE DRAWINGS

FIG. 8 is a table that summarizes by measurement type and dose group the pulmonary function tests (PFT) results and other physiologic measurements.

DETAILED DESCRIPTION OF THE PREFERRED EMBODIMENTS

Figure 1:
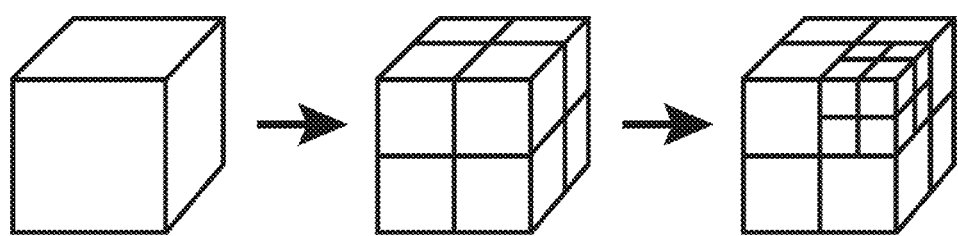
FIG. 1 shows an example octree decomposition for reducing images to obtain image subdivisions.

The present invention is directed to methods of assessing heterogeneity in images. The present invention combines methods of 3D image analysis and applies them to the problem of discerning disease signatures in organs, also known as image-based biomarkers. Octree decomposition, which iteratively subdivides an image—with each division producing eight evenly sized octants (e.g., an initial 512× 512×512 region decomposed into eight 256×256×256 octant regions, and so on)—reduces the image to boxes of maximum size with minimal heterogeneity within each box. Octree decomposition isolates regions of tissue that are relatively homogeneous and calculates their spatial relationship.

The present invention also includes comparative analysis, such as variogram or correlogram analysis, in which the spatial relationships between the boxes are examined in, for example, a variogram—a common geostatistical tool that compares variance to distance.

The present invention also discloses a heterogeneity metric that relates the relationship of the variograms of diseased tissue to healthy tissue.

The present invention also eliminates portions of the tissue that do not contribute to the disease. For example, in the lung, the present invention generally eliminates boundaries, airways, vasculature, etc. from consideration and focuses on the diseased tissue.

The present invention also provides a single metric that can be used to distinguish disease from healthy tissue.

EXPERIMENTAL SECTION

The following examples serve to illustrate embodiments and aspects of the present invention and are not to be construed as limiting the scope thereof.

Example 1

Materials and Methods

Disease Model

An elastase-induced model of emphysema was used in this study. Nine male Sprague-Dawley rats with an average weight of 212±11 g were orally intubated and dosed intratracheally with: 250 U/kg elastase dissolved in 200 µL, saline to the whole lung (n=3), or 50 U/kg elastase in 200 µL, saline to a single lobe (n=3), or 200 µL, saline as a control (n=3). Dosing levels were based on our previous work in which emphysematous changes were detected using $^3$He diffusion MRI and histology (Jacob et al. 2008). All animal use was approved by the Institutional Animal Care and Use Committee at Pacific Northwest National Laboratory (PNNL).

CT Imaging

Three weeks following dosing, the rats were imaged using micro-CT. At this time, rats weighed 357±10 g. This imaging procedure is described in detail in Jacob et al. 2011. Briefly, rats were anesthetized, intubated, and mechanically ventilated at 1 Hz with 40% inhale and 60% exhale durations. Peak inhalation pressure was ~8 cmH$_2$O, and no peak end expiratory pressure was used so that images could be acquired at functional residual capacity. Anesthesia was maintained by providing 3-4% isoflurane in air (30% O$_2$, balance N$_2$). Sigh breaths were delivered periodically to maintain lung recruitment. A respiratory-gated GE eXplore 120 micro-CT scanner was employed with the following settings: 100 kV peak voltage, 50 mA tube current, 16 ms exposure time, and 360 projections with 1 degree angular steps. Images were reconstructed with supplied software to 150 µm isotropic resolution. Total imaging time was about 90 minutes due to the collection of multiple images throughout the breathing cycle; however, only the images acquired at full exhalation were used for the analyses herein. Postmortem histology and tissue analysis were not possible due to in situ lung casting for other research purposes (i.e. supplying airway tree geometries for computational fluid dynamics models (Corley et al. 2012, Minard et al. 2012)).

Image Preparation

A lung mask image was semi-automatically generated from the above-mentioned reconstructed images using ImageJ and the ImageJ 3D Toolkit plug-in. Starting from a seed-point inside the lung, a 3D connected threshold was applied with the threshold value empirically selected to exclude major vasculature and all external tissue, so that only lung tissue would be included in analysis. Mask boundaries were smoothed using the Region Dilate and Region Erode functions in succession. Applying the mask to the reconstructed images, all background was thus assigned an intensity value of 0, and all unmasked lung tissue retained original HU values. A five pixel diameter 3D median filter was then applied in order to reduce noise while contributing minimal blurring. Finally, the image canvas size was increased to 512×512×512 by zero-filling in each direction. Zero-filling to a power of 2 served to conveniently restrict all octants in the octree decomposition to isotropic cubes.

Octree Decomposition

An automated octree decomposition was performed by iteratively subdividing an image, with each division producing eight evenly sized octants (e.g., the initial 512×512×512 image was decomposed into eight 256×256×256 octant regions, and so on, as shown in FIG. 1. After each division, the maximum, minimum, mean, and standard deviation of the signal intensity were calculated for each octant region.

Then, iterative octant subdivision of a region occurred if either the standard deviation of that region exceeded a user-defined threshold, or if the region contained at least one voxel—but not all voxels—with intensity equal to the background signal (i.e. 0). However, regions reaching a minimum size of 2×2×2 were not subdivided. At the end of the decomposition, all boxes with a mean HU value≠0 and dimensions greater than 2×2×2 represented portions of lung with relatively uniform HU values. Following decomposition, results were binned according to HU and box size for histogram display. Boxes containing at least one 0 were not included in the binning. Octree decomposition was implemented in Python and executed on a MacPro model 3.1.

There are multiple approaches to selecting the aforementioned user-defined threshold criteria. For example, boxes may be subdivided if the HU range in the box exceeds 10% of the range of values in the entire image (Subramaniam et al. 2007). Because the rats in this study had different ranges of HU values depending on disease severity standard deviation was used as the threshold criterion, as it does not require normalization.

Variogram Analysis

Variograms were used in this context to determine the spatial relationships between regions of the lung that are relatively homogeneous. The octree decomposition isolated regions of relatively high homogeneity; therefore, each resulting cube was treated as a homogeneous "voxel" using the mean value of the cube as the voxel intensity. Furthermore, octree cubes of the same size were used. The largest cube sizes that resulted from the octree decompositions were mostly 8×8×8 with a few 16×16×16. In order to ensure a sufficient number of cubes that were distributed throughout the lung and to enhance statistical power (Keil et al. 2012), each 16×16×16 cube was further broken down into 8×8×8 boxes, and all 8×8×8 boxes were used in the variogram analysis. This approach assumed that emphysematous disease was manifest on a scale greater than an 8×8×8 cube, which for these images is 1.2 mm on a side—this is consistent with what observed in this disease model in previous work (Jacob et al. 2008). Excluding the smaller boxes largely eliminated vasculature, conducting airways, boundaries, and other features that had high spatial variability (Zhang et al. 2005).

The calculation of the variance (or semi-variance) γ(d) of the differences in signal intensity I is described in detail in many geostatistics texts (Dua et al. 2010, Gringarten et al. 2001) and is given by:

$$\gamma(d) = \frac{1}{2N(d)} \sum_i^{N(d)} [I(x_i) - I(x_i - d)]^2 \qquad [1]$$

where d is the distance between voxel centroids, x is the voxel location in 3D, and N is the number of voxel pairs. For an image with n voxels, $$N = n(n-1)/2. \qquad [2]$$

The average semi-variance at each distance was calculated. Results were plotted on a distance vs. variance graph, or variogram, which graphically represents the spatial dissimilarity within the image.

Variograms characterize spatial relationships between boxes of relatively high homogeneity that were dispersed throughout the lung. However, as described in previous work with brain images (Keil et al. 2012), increased distances between voxels, or octants, lead to decreased likelihood that the voxels are related in any way. This is especially true in the lung, which is composed of largely independent lobes (five in the rat). Moreover, the spatial relationship between parenchymal signal intensity in different lobes is most accurately described by a unique path up and back down the airway tree, potentially covering 20 or more orders of branching (Schulz 2000). The spatial distances are analogous to the "regionalized variable" in the geological context of mineral distribution. Indeed, the regionalized variable, or the maximum distance $d_{max}$ over which the variogram is expected to be reliable, is estimated to be one half of the diameter of a region (Keil et al. 2012). Therefore, the variogram analysis in this study was limited to a region that represented half of the average dimension of the left lobe, which is typically the largest lobe in the rat. This assumes that the disease varies slowly compared to the box size but rapidly compared to the lobe size. Using the 3D images and a lung cast, $d_{max}$ was measured to be ≈8 mm (53 pixels) in the healthy rats, which was rounded up to the equivalent of seven face-bordering 8×8×8 boxes, or 56 pixels.

Octree Decomposition Tests

The following evaluations of the appropriateness and robustness of the octree and variogram approach were performed.

Threshold Range

The octree decomposition compared the standard deviation of the lung signal within a box to a threshold range to determine whether the box should be subdivided. The optimal threshold range was determined semi-empirically. As a starting point, the typical standard deviation of the lung tissue of the three control rats was calculated. This was accomplished by producing a histogram of each masked image and then fitting the main lung peak to a Gaussian curve. The mean of the control rats' standard deviations (σ) was set as the initial threshold range. The effects of thresholds that were σ/3, 2σ/3, 4σ/3, and 2σ were tested by rerunning the decomposition on the same images. The effectiveness of each threshold range at grouping the control rats and at distinguishing the full-lung-dose rats from the control group in the variograms was evaluated.

Image Filtering

The following were examined: the effects of image filtering by generating variograms from unfiltered images, images filtered with a five pixel diameter 3D median filter, images filtered with a 3D Gaussian blur of radius=2, and images filtered with a 3D Gaussian blur of radius=4. Filters were applied in ImageJ prior to applying the mask. The number of octree boxes and differences in the variograms were compared. Adjustments to the threshold range were made for each filter test based on the standard deviation of the filtered image.

Image Translation

Rat positioning during imaging can vary from animal to animal, and the octree decomposition should be independent of this. Therefore, the effects of image translation on the variogram results were tested. For the variogram analysis, the largest unit box retained after decomposition was 8×8×8; therefore, a shift in the image by 8 pixels in any (or all) dimensions should result in no change to the resulting variogram, since the original image had isotropic dimensions of 2". Conversely, maximum change would occur from a four-pixel shift. To test the significance of the effects of translation, the image of one rat was shifted in x, y, and z by four pixels and by eight pixels using ImageJ, and variogram results were compared to those of the original image.

Image Rotation

Animal positioning can also have an apparent effect on image rotation, and octree decomposition should be insensitive to this. Using the same rat image as used in the translation test, an arbitrary 3D rotation was imitated by rotating the image $\pi/4$ radians about the x, y, and z axes using ImageJ. Results were compared to the original image and to the results of the translation test.

Image Downsampling

To demonstrate the increased value of the combined octree and threshold approach for establishing the 8×8×8 boxes versus simply downsampling the image, variograms were generated using standard image downsampling as a comparison. For this, a bilinear downsampling to the 512×512×512 image was applied, creating a 64×64×64 image—each voxel the equivalent size of an 8×8×8 octree box. Then variograms were generated utilizing the intensity value of every voxel in the 64×64×64 image (excluding the background voxels, again defined as those voxels with intensities equal to zero).

Emphysema Index and CoV

The percentage of lung below a HU threshold value, or emphysema index, was calculated for each rat to compare this conventional measurement of disease severity with the variogram results. Because there is no established HU threshold level in rat models of emphysema, the percentage of voxels with HU values below two standard deviations from the control-group mean were counted. This level was determined to be −717 HU. Calculations were made on the same masked images used for octree decomposition.

The CoV was calculated for each rat by fitting a histogram of the masked lung images to a Gaussian curve and taking the ratio of the standard deviation to the mean.

Statistical Analysis

Comparisons of variograms of the three control group rats were made using the Kruskal-Wallis (KW) rank sum test with a null hypothesis of $\alpha=0.05$. This indicated whether there were significant differences within the group. For pairwise comparisons, a Mann-Whitney-Wilcoxon (MWW) rank sum test was employed, also with a null hypothesis of $\alpha=0.05$.

Results

CT Images

Figure 2:
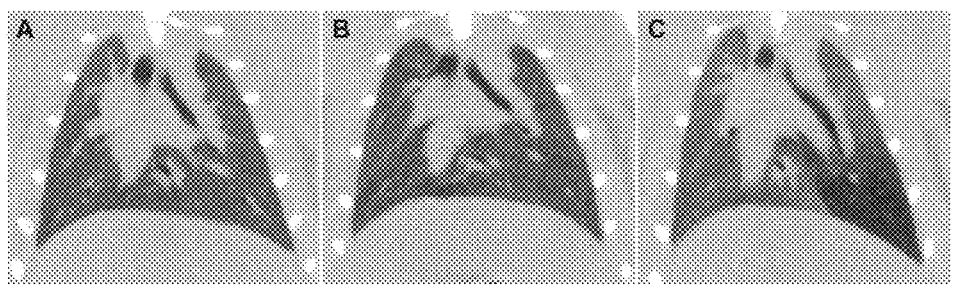
FIG. 2 shows unfiltered coronal slices from 3D images of (A) a control rat, (B) a rat dosed to the full lung with elastase to induce mild emphysema, and (C) a rat dosed to the distal portion of the left lobe with elastase to induce local emphysema.

FIG. 2 shows a representative unfiltered coronal slice from a rat in each dose group: panel A is a control rat, panel B is a full-lung-dose rat, and panel C is a partial-lung-dose rat. The dose was delivered to the distal portion of the left lobe. Overall, it was difficult to discern qualitative differences between rats in the control group and the full-lung-dose group: the mean HU value (±standard deviation) of the former was −544±58 and the mean of the latter was −594±38. In spite of marginally lower HU values that would be expected from emphysematous disease, an analysis of variance showed that the two groups were indeed not statistically different (p=0.26). On the other hand, the partial-lung-dose rats showed a bimodal distribution of HU values because the diseased regions of the lung were distinct and considerably different than the healthy regions. An example of this can be seen in the lower portion of the left lobe of the partial-lung-dosed rat (panel C) where the signal intensity is substantially lower than the rest of the lung by ≈200 HU—indicative of severe tissue destruction and air trapping, which are characteristics of emphysematous lungs (Spencer 1985). Based on the overall HU measurements, it is presumed that the full-lung-dose rats developed a mild—and difficult to distinguish—emphysematous disease while the single-lobe-dose rats developed a more severe, albeit localized, disease.

Octree Decomposition Tests

Threshold

The starting octree decomposition threshold level determined from the standard deviations of the control rats (Section 2.6.1) was 60±1 HU; therefore, 60 HU was used as the initial threshold level. Thus, the other threshold levels tested were 20, 40, 80, and 120 HU. Octree decompositions were performed using the different threshold levels on the three control rats, and variograms were compared using a KW rank sum test. The threshold level that showed the least difference among the control rats was 40 HU (p=0.12), with 60 HU also showing no significant differences (p=0.09). The 20, 80, and 120 HU thresholds did have significant differences among the controls (p=0.02, p<0.0001, and p<0.0001, respectively). Based on this result, the threshold level of 40 HU was used for all subsequent octree decompositions (unless otherwise noted).

Image Filtering

Results of applying the different filters showed that the variograms from the unfiltered image and the image with the median filter were indistinct in an MWW test (p=0.62). However, the relatively noisy unfiltered image resulted in about 20% fewer 8×8×8 boxes than the filtered image. This was in spite of a higher threshold that was used, 48 HU, based on the unfiltered image's standard deviation. The radius=2 and radius=4 Gaussian filter results also did not differ significantly from the unfiltered image (p=0.41 and p=0.48, respectively) or from the median-filtered image (p=0.71 and p=0.84, respectively). A KW test showed that the radius=2 filter resulted in control group variograms that were not distinct (p=0.16), but the radius=4 variograms were (p=0.0001). However, because of the blurring caused by Gaussian filters, the number of 8×8×8 boxes that resulted from the Gaussian-filtered images was about 30% higher than the median filtered image, presumably because vascular structures and edges were not well preserved. Threshold levels used for the radius=2 and radius=4 images were 37 HU and 39 HU, respectively, based on the post-filtering standard deviations.

Effect of Downsampling

Figure 3:
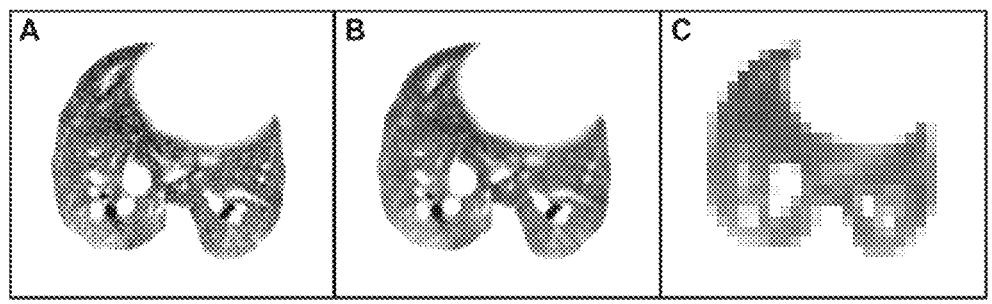
FIG. 3 shows an example of an image that was masked and is also (A) an unfiltered image, (B) the image with a five voxel diameter 3D median filter, and (C) the same image downsampled to ⅛ resolution, or 64×64×64 pixels.

FIG. 3 shows an example of an original image (panel A), the image with the five voxel diameter 3D median filter (panel B), and the same image downsampled to ⅛ resolution, or 64×64×64 pixels (panel C). The variograms made from the downsampled images of the three control rats were statistically different in a KW rank sum test (p<0.0001). On the other hand, the variograms made from only the 8×8×8 boxes that came out of the octree decomposition were not (p=0.12).

Translation and Rotation

Results of image translation and rotation were compared for one rat. For the eight-pixel translation, variogram results were exactly identical to that of the original image, as expected. The four-pixel shift was not statistically distinct from the original image as confirmed by a MWW test (p=0.96). In addition, the result of the rotation showed no significant change from the original (p=0.56) or from the four-pixel shift (p=0.59). Thus, it is confirmed that shifts or rotations to the image (i.e. alternative positions of the lung during imaging) do not result in significant changes to the resulting variograms.

Octree Decomposition

Figure 4:
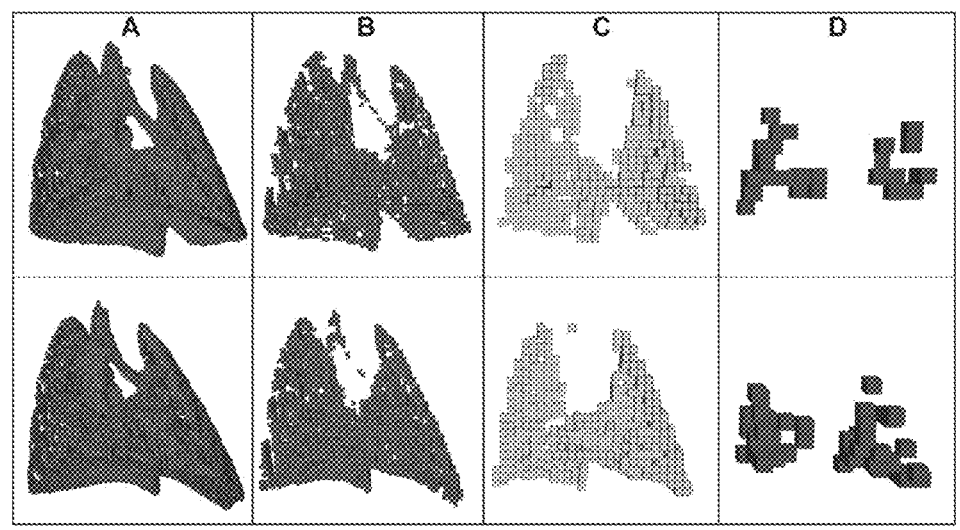
FIG. 4 shows octree decomposition results from two rats. The top row is for a control rat and the bottom row is a single-lobe-dose rat (the same as those shown in FIG. 2). Columns A, B, C, and D show the resulting 2×2×2, 4×4×4, 8×8×8, and 16×16×16 boxes, respectively.

FIG. 4 shows the results of the octree decomposition on a control rat and on one with severe disease in the lower left lobe (see FIG. 2C). Column A shows the 2×2×2 boxes, and column B shows the 4×4×4 boxes. These box sizes largely define the fine structures and edge details, including the conducting airways and vasculature. For this reason, we ignored the 2×2×2 and 4×4×4 boxes for the variogram analysis. Column C shows the 8×8×8 boxes and their relatively uniform distribution throughout the lung. Conversely, the less uniform distribution of the considerably fewer 16×16×16 boxes—the largest that resulted from octree decomposition—is shown in Column D. The lower left lobe of the treated rat (column D, bottom) has a noticeably higher density of 16×16×16 boxes than that of the control rat, indicating homogeneous and prevalent, albeit localized, CT signal intensity.

Figure 5A:
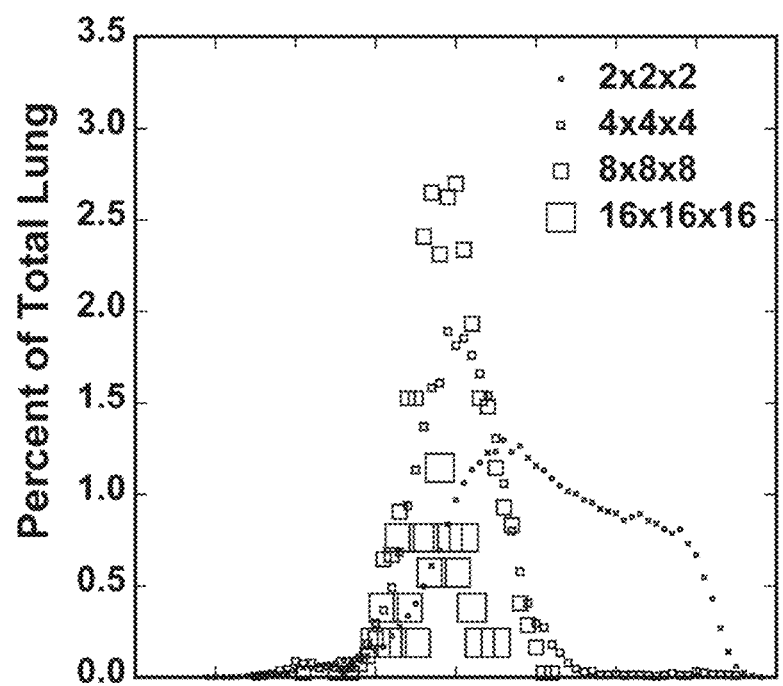
FIG. 5 shows graphs of octree decomposition histograms showing the relationship between box size, HU, and percentage of the lung by each box size at each HU level for (A) control, (B) full-lung dose, and (C) single-lobe dose.
Figure 5B:
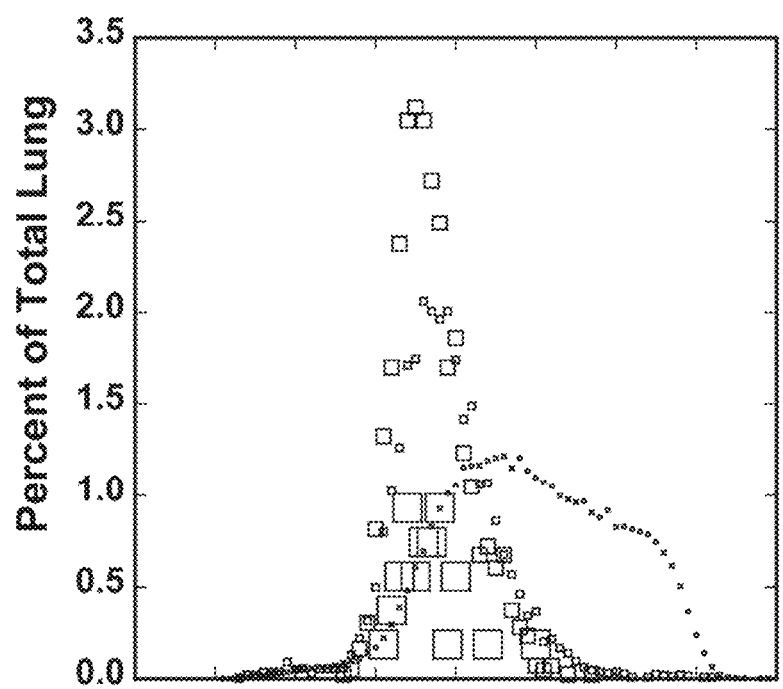
Figure 5C:
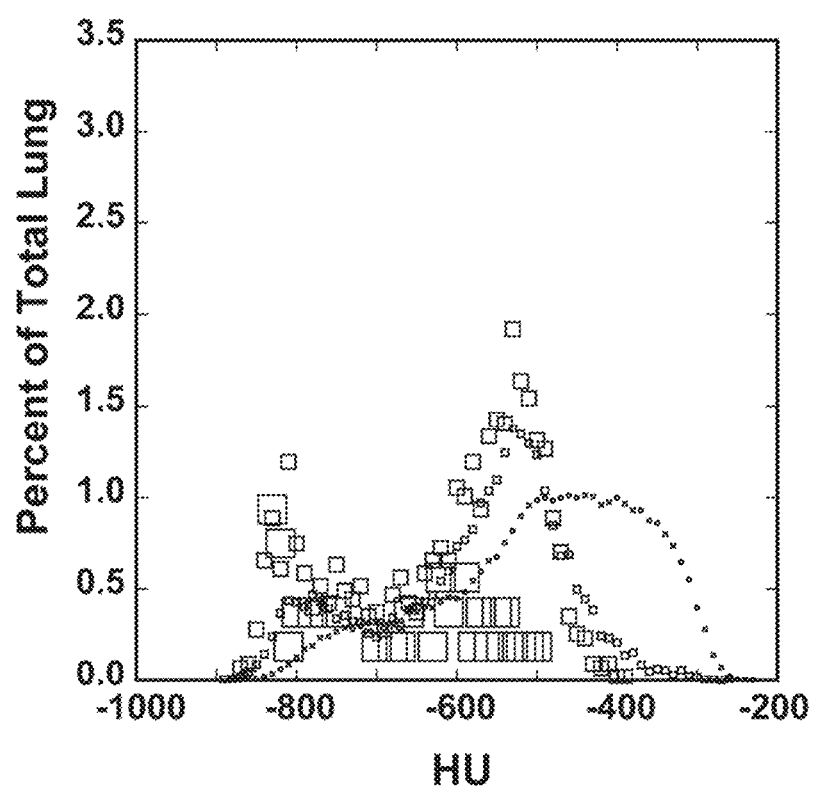

Histograms of the octree decomposition for three rats are shown in FIG. 5. The marker size corresponds to the box size. In the control and mild disease rats (panels A and B), the different sized boxes, other than the 2×2×2's, are approximately Gaussian distributed about the mean HU value of the lung, whereas the single-lobe-dose rat (panel C) shows a bimodal distribution, indicative of at least one large region of the lung with considerably lower HU values. These histograms show what percentage of the lung at each HU intensity is defined by the different box sizes, but they do not convey any information about the spatial relationships of the boxes.

Variograms

Figure 6:
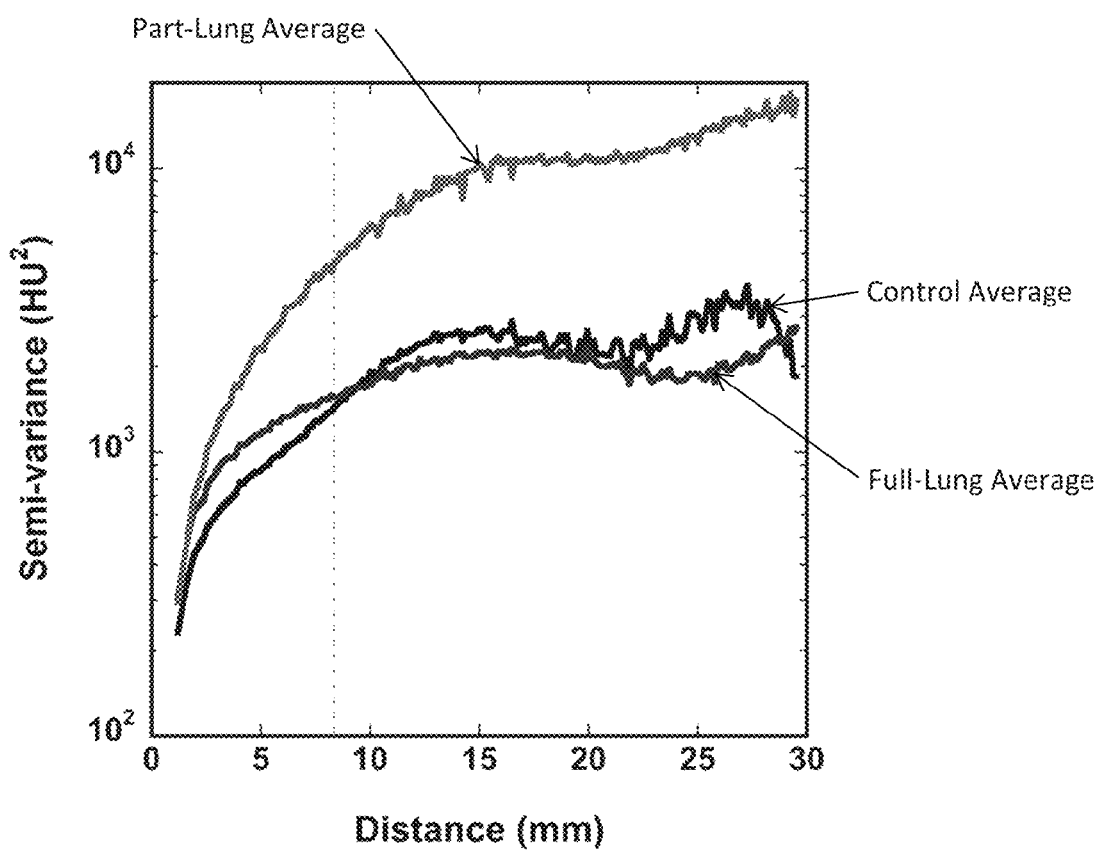
FIG. 6 shows variograms averaged for each dose group. The dashed line shows the extent of $d_{max}$, the characteristic lung distance to which variograms were analyzed for heterogeneous variations.

In order to visualize the spatial relationships between the 8×8×8 boxes (and decomposed 16×16×16 boxes), variograms were constructed. FIG. 6 shows the average variograms from the three different dose groups. The dashed line in FIG. 6 denotes the range of $d_{max}$ (see section 2.5). For $d \le d_{max}$, A KW test showed that the control rats were statistically similar (p=0.12), and a MWW test showed that the dose groups were each statistically distinct from the control group (p<0-0001) and from one another (p<0.0001).

Emphysema Index, CoV, and Heterogeneity Score

Figure 7A:
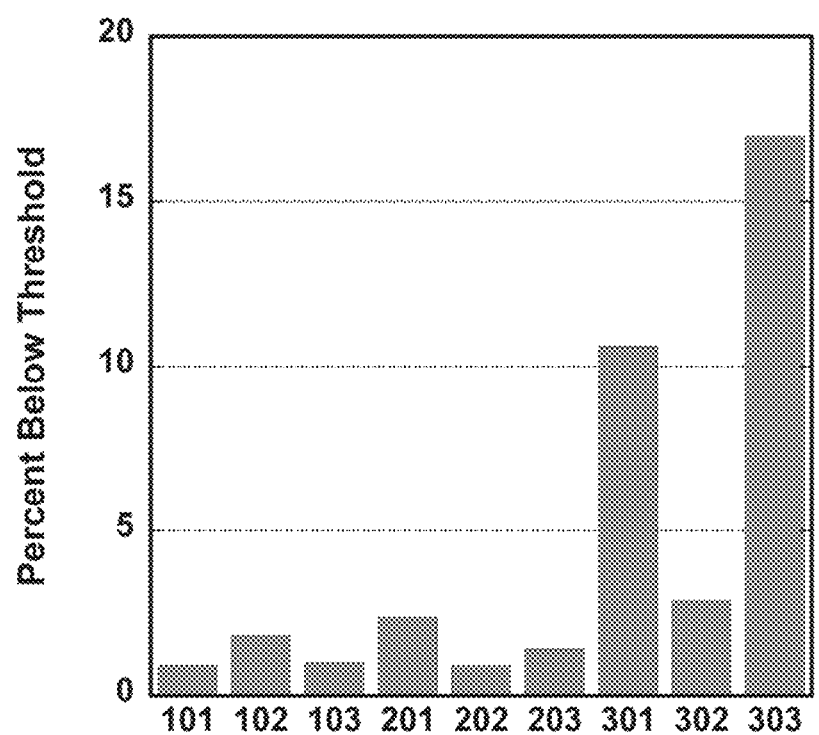
FIG. 7 shows bar graphs of (A) percentage of image pixels with HU values below two standard deviations from the mean of the control group, (B) coefficient of variation (CoV), and (C) the average distance of each individual rat's variogram from the mean of the control group. The x-axis labels are animal numbers: 100s are controls, 200s are full-lung-dose, and 300s are single-lobe-dose. 301 and 302 received the dose in the right caudal lobe, and 303 received the dose in the distal region of the left lobe (FIG. 2C).
Figure 7B:
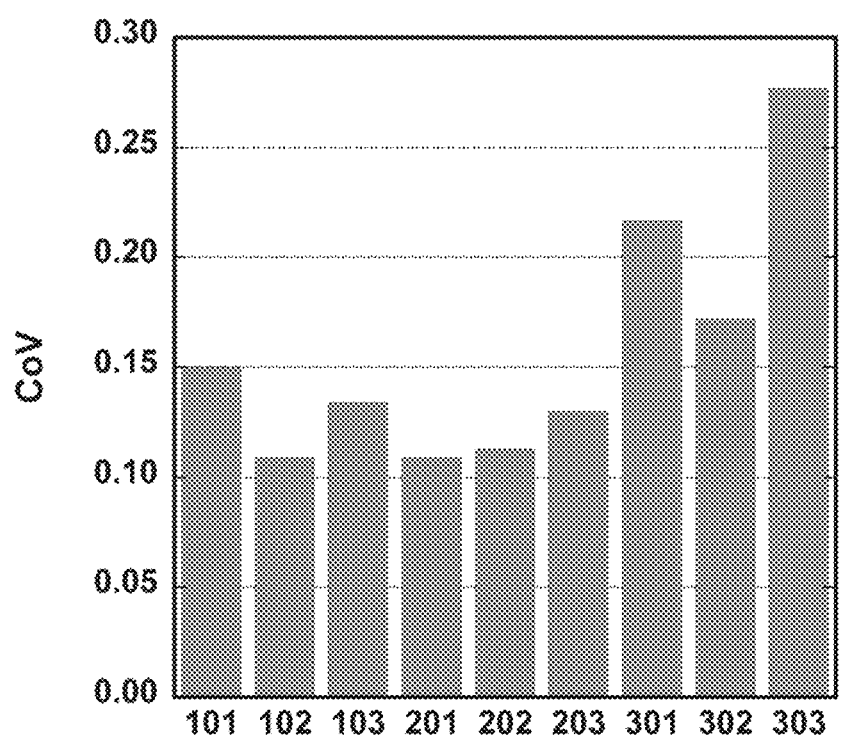

Results of the emphysema index are shown in the FIG. 7A. Although the number of rats is too small to reliably calculate sensitivity and specificity, the graph shows that there is considerable overlap between subjects in each dose group, likely indicating poor sensitivity and specificity. The CoV for each rat is shown in FIG. 7B. Similarly, there is no distinction between the control and full-lung dose groups. The part-lung dose group had considerably higher CoV values, because the standard deviation was enlarged due to a bimodal (and non-Gaussian) distribution of HU values.

Figure 7C:
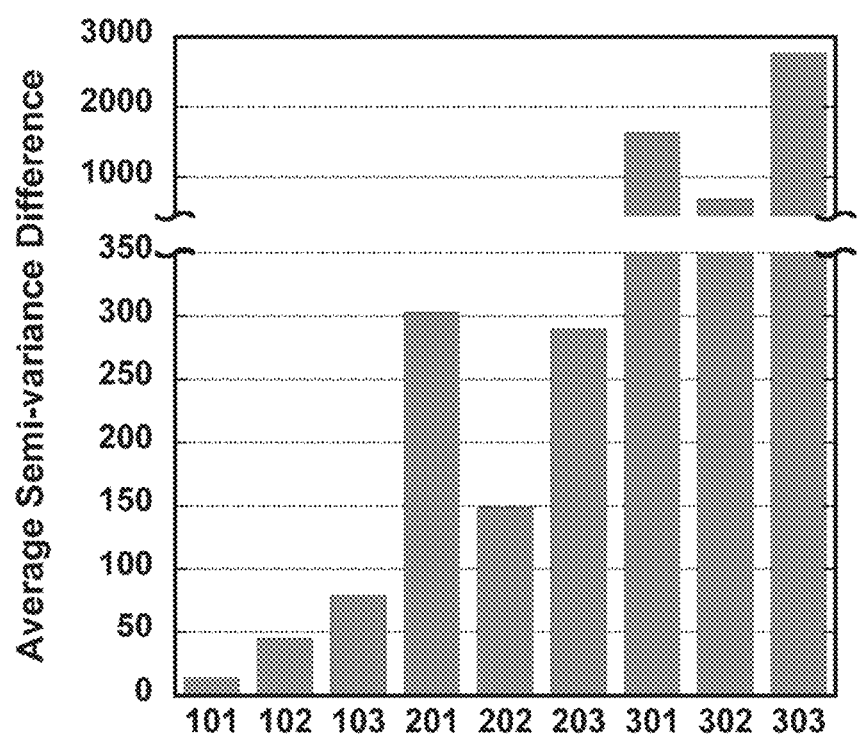

For comparison, the average distance Δ of each rat's variance from that of the control group average was calculated, as shown in FIG. 7C. The lowest full-lung dose rat has a Δ that is 2× higher than the highest control rat. There is no overlap between dose groups, implying better sensitivity and specificity than the other metrics.

Discussion

This work combined two different data analysis tools, octree decomposition and variograms, to study tissue heterogeneity in lung disease. This merged approach was better able to differentiate rats with mild emphysematous disease from the healthy control group than methods that relied on absolute HU values. The main criterion for octree decomposition was based on the standard deviation of HU values within an octree box. An advantage to this approach is that it avoids thresholding according to HU values; rather, it focuses on heterogeneity-based signatures that may characterize disease (Mets et al. 2012). It is proposed that a heterogeneity score Δ, the average distance of a rat's variance from that of the control group average, may be useful to classify disease severity. Furthermore, to visualize the regions of the lung with the greatest heterogeneity, one could determine which boxes had the highest semi-variance within $d_{max}$ and map them back to the original image. This would provide 3D information about the spatial distribution of lung tissue heterogeneity and, potentially, disease distribution.

Another approach to a disease metric might be that of fitting the data to an established variogram model, most of which describe an asymptotic rise in variance (i.e. variance becomes independent of distance indicating that spatial relationships become random (Clark et al. 2000)). This is seen to some degree in the data of FIG. 6. However, within the range of $d \le d_{max}$, it was found that a power law model generally fit the data better than other models. This model typically describes fractal behavior (Bohling 2007). Initial investigations into this model showed potential promise at using fit parameters to distinguish dose groups; however, results lacked statistical significance, and the full-lung dose group tended to not fit this model as well as the other two groups.

There was no single variogram model that satisfactorily fit the all the data over the entire range of distances, because the complex geometries found in the lung result in some problems for variograms. In particular, the direct linear path between two regions of the lung separated by large distances often crosses non-lung tissue, such as the heart, which are essentially treated as holes or voids in the geometry. Furthermore, neighboring lobes generally do not interact physiologically except through the vascular and airway trees, which may only connect regions through many orders of branching. To limit the problem in this study, the distance of variogram analysis was constrained to approximately half the characteristic diameter of the largest lobe. However, to better understand the inter- and intra-lobe variance relationships, the lung could be segmented into lobes (if the image is of sufficient resolution to discern lobar boundaries), and the decomposition/variogram process repeated on the segmented images. Though, by ignoring inter-lobar variances, this approach would likely not capture information about disease that was confined to a single lobe, particularly if the entire lobe was affected homogeneously.

Octree decomposition was employed prior to generating the variograms. In doing this, it was assumed that the emphysematous disease is generally slowly varying over space, and that the disease causes changes to homogeneity on the order of or less than the lobar length scale but greater than the octree box length scale (Litmanovich et al. 2009, Spencer 1985). This is consistent with what was previously observed using 3He MRI in the same disease model (Jacob et al. 2008). Without this assumption, variograms would have to be made directly from the raw images. This is possible but impractical, because the semi-variance computation time (and resulting file size) is proportional to the number of voxel pairs, which rises approximately as n2 (see Eq. 2). The variogram computation time was measured for 1078 octree-decomposed boxes from one rat to be 6.6 seconds (on a MacPro model 3.1), and it was verified experimentally that the computation time indeed rose in proportion to the square of the number of voxels. Therefore, to create a variogram on the entire masked 3D image, which consisted of 1.48×106 voxels (of lung tissue only), it would take ≈1.25×107 seconds, or about 5 months—with a resulting file size on the order of 20 GB. Therefore, octree decomposition dramatically reduces the computation time while focusing non-objectively on regions of the lung that are of greatest interest. The octree decomposition itself was performed in ~2 minutes.

An alternative to octree decomposition is downsampling, which is a quick and straightforward approach to reducing image size. However, it was verified that the octree decomposition approach performed much better at separating dose groups than simply downsampling the image and then calculating the semi-variance using every voxel. The octree decomposition assures that only the homogeneous regions of the lungs are singled out for comparison, whereas downsampling the image blurs together proximal voxels, including vasculature, airways, and lung boundaries irrespective of signal intensity or tissue type. Thus, the downsampling approach apparently causes a loss of information. The radius=4 Gaussian filter had a result similar to downsampling.

Example 2

This second example demonstrates the 3D imaging and analysis approach using variograms of octree-decomposed images, as described above, to detect subtle injury in radiation-exposed rat lungs. It has been shown that lung injury in radiation-exposed rat lungs includes acute inflammation in the weeks after exposure and chronic fibrosis in the months after exposure while providing a relatively uniform injury over the dosed area (Lehnert et al. 1989, Ward et al. 2004, and Ward et al. 1993). It is shown that the results of the variogram analysis on octree-decomposed CT images and 4DCT-based volume maps of irradiated lungs correlates with radiation dose better than physiologic measurements, conventional pulmonary functions tests, or CT density measurements.

Materials and Methods

All animal use followed a protocol approved by the Institutional Animal Care and Use Committee at PNNL. Twenty-five female Sprague Dawley rats weighing 216±9 grams were used.

Lung irradiations employed a ~6400 Ci Co-60 gamma source with a ~30 cm thick lead collimator. The collimator was trapezoidal to match the basic outline of the lungs, with dimensions based on a 3D image of a weight-matched control rat: 15 mm wide at the top, 30 mm wide at the bottom, and 26 mm high. The bottom was convexly tapered by 5 mm in the center to minimize exposure to the liver. The resulting beam was then calibrated in terms of absorbed dose to tissue (Gy/min) using a tissue-equivalent ionization chamber (Exradin model A12, Standard Imaging, Middleton, Wis.) connected to an electrometer (model 617, Keithley Instruments, Cleveland, Ohio) to collect the resulting current. Appropriate corrections were applied to convert from exposure in air to absorbed dose in tissue (Report 30, 1979). The measured absorbed dose rate for the estimated location of the lung center (~1.5 cm from collimator face) was 3.74 Gy/min. It was determined that 1.5 cm of tissue results in approximately 5% reduction in absorbed dose rate, resulting in an estimated 3.55 Gy/min at lung center. One of five calculated doses of 0.0, 5.9, 8.8, 11.8, and 14.7 Gy (hereafter referred to as 0, 6, 9, 12, and 15 Gy) was delivered to the thorax; this dose range has been shown to cause significant injury in other rat strains (Ward et al. 1993, Ghosh et al. 2009, and Novakova-Jiresova et al. 2007). The dose rate to the body was measured to be ≤0.3% of that at the lung center. The dosed region was confirmed in a weight-matched rat using an x-ray source and Polaroid radiographic film.

Anesthetized rats were placed in a custom-made, contoured holder to facilitate reproducible positioning of the rat thorax directly in front of the collimator. Rats were randomly assigned a radiation dose, with 5 rats per group. Irradiations were blind to the staff performing other measurements in order to reduce bias.

Following irradiation, rats were returned to the animal facility where they were individually housed, provided food and water ad libitium, and observed daily for general well-being. One rat from the 6 Gy group developed a ~3 cm growth on its back and was eliminated from the study. Otherwise, no mortality or outward signs of poor health were observed. Two additional rats were kept in the same room as health sentinels, and at the end of the study they were confirmed to be seronegative for common rat pathogens.

At 6 months post-irradiation, rats were subjected to pulmonary function tests (PFT) and microCT imaging. First, a whole body plethysmograph (WBP; Buxco Research Systems, Wilmington, N.C.) was used to measure breathing rate, tidal volume, and minute volume of unanesthetized, unrestrained rats for ~5 minutes. Rats were acclimated to the chamber for ~10 minutes per day for several days prior to the test.

Next, rats were imaged using 4DCT (multi-time-point 3D imaging). Details of animal preparation, ventilation, and 4DCT imaging closely follow those described in Jacob et al 2011. Rats were anesthetized with 4% isoflurane in oxygen, orally intubated with a 14 gauge catheter tube, and connected to a computer-controlled mechanical ventilator (model 830/AP, CWE Inc., Ardmore, Pa.). Rats were maintained on isoflurane and ventilated with 30% $O_2$ (balance $N_2$) at 54 breaths per minute, with a 500 ms inhale duration and no breath hold. Periodic sighs were delivered every 100 breaths to maintain lung recruitment. The ventilator recorded tracheal pressure, inspiratory volume, and expiratory volume. Peak inspiratory volume (PIV) was ≈2.1 mL. No positive end expiratory pressure was used so that images could be acquired at full passive exhalation when the lung volume was at functional residual capacity (FRC). A microCT scanner (eXplore 120, GE Healthcare, Waukesha, Wis.) with ventilatory gating was used to acquire eleven images throughout the breathing cycle in 26 minutes with 100 ms temporal resolution (It should be noted that only the images at the breathing cycle extremes—FRC and PIV— were analyzed for this study). Gating was tested by comparing the ventilator gate signal to a signal sent by the scanner upon firing x-rays; the delay between the ventilator trigger and x-ray firing was found to be ≤250 µs. CT imaging parameters were: 80 kVp, 32 mA, 16 ms exposure time, and 360 projections with 1° angular separation. The estimated radiation dose from all images was 940 mGy. Images were reconstructed to 200 µm isotropic resolution using supplied software. It was empirically found that this resolution provided sufficient detail for later analysis.

Following imaging, PFT were performed. Rats were anesthetized with an intraperitoneal injection of Ketamine/Xylazine and surgically intubated for measurement of inspiratory volumes, forced expiratory volumes, and quasi-static chord compliance using a Forced Maneuvers system (Buxco Research Systems, Wilmington, N.C.). PFT measurements took ~5 minutes Immediately after the pulmonary function tests, animals were euthanized via $CO_2$ asphyxiation, and lungs were excised to obtain wet and dry weights.

Acquired images were processed with a 5 pixel diameter 3D median filter to remove noise while maintaining feature boundaries. These filtered images were then masked to assign intensity value 0 to non-lung regions; filtered images were multiplied with a binary image created using the 3D connected threshold tool in the 3D Plugins Toolkit of ImageJ to delineate lung from non-lung based on intensity. From these masked images, the mean and standard deviation u of the distribution of Hounsfield units (HU) in the lung were determined. The coefficient of variation (CoV) was then calculated by taking the ratio of σ to the mean.

Octree subdivision reduces the original volume into eight octants of equal dimension (see FIG. 1). Images were first zero-filled to 256×256×256 so that octree subdivision would result in isotropic cubes. Iteratively, each octant was further subdivided if it contained any mask voxels or if its u exceeded a threshold value t, unless the octant reached a minimum size of 2×2×2. All octants containing the mask value of 0 were discarded from further analysis. Remaining octants larger than 2×2×2 represented relatively homogeneous sections of the lung, while the 2×2×2 cubes defined boundaries and regions with high spatial variability. In developing this approach, the optimal t was empirically determined to be approximately two-thirds the mean of the control group's whole-lung σ; t was 38 HU in this study. Octree decomposition was executed in Python on a Mac Pro 3.1 in ~2 minutes.

After octree decomposition, variogram analysis was performed to determine spatial relationships between octants. As mentioned above, a variogram is a distance vs. variance (or semi-variance) graph, whereby variance is the square of the difference in mean signal intensity between two given octants, and distance is between octant centroids. Variograms were constructed using only 8×8×8 octants—the largest that were generated from the decomposition. This selection assumes that any radiation-induced abnormalities would generally be manifest on a scale larger than an 8×8×8 cube, which had dimensions of 1.6 mm×1.6 mm×1.6 mm. Furthermore, this eliminated the smaller cubes that tended to define features of high spatial variability. Because of the complex geometry of the lung—generally independent lobes often separated large distances by non-lung tissue—the variogram analysis was limited to a maximum distance $d_{max}$ (Keil et al. 2012), which we defined as approximately one half the characteristic diameter of the left lobe. From the control group images, $d_{max}$ was measured to be about 12 mm. Variogram calculation was executed in Python in ~7 seconds. The octree decomposition improved the speed of the 3D variogram calculation ~700-fold as compared to previous approaches (Keil et al. 2012).

To examine potential alterations to lung ventilation patterns, volume change maps (maps showing the volume change between FRC and PIV, also known as ventilation maps) were calculated from CT images as described in (Jacob et al. 2013) using a method closely following Yin 2011. In brief, the PIV image was warped to the FRC image, then voxel-by-voxel volume change was calculated using the determinant of the Jacobian of the resulting warp vector field and the HU values of the original CT images. CoV measurement, octree decomposition, and variogram analysis were performed on the volume change maps as described above.

We attempted to fit standard variogram models to the resulting data. For the raw CT images, a power-law equation of the form:

$$y = C + md^\alpha \qquad [3]$$

was least-squares fit to the data. C is a constant, m is the initial slope, d is the distance between octree cube centers, and α is an exponent that represents how rapidly the octree cubes become increasingly spatially dissimilar. Higher values of α (for α>1) indicate that the variance is increasing at an increasing rate, implying that the lung becomes more heterogeneous on average with increasing distance from any given location. The ventilation maps, on the other hand, were fit to a model of exponential rise to an asymptotic value:

$$y = S[1 - \exp(-3d/R)], \qquad [4]$$

where S is the asymptote (referred to the "sill" in geostatistics), d is the distance between octree cubes, and R (the "range") is the distance at which the variance reaches ≈95% of S. The range characterizes the local "roughness," with a larger R indicative of smoother variation. At distance R, the image becomes random, with little spatial change in variance. The sill indicates the degree of randomness or variety across the image. To compare measured parameters of the dosed groups against those of the control group, an analysis of variance was performed with a Dunnett post hoc test, using a null hypothesis of α=0.05. The significance of the correlation of dose level to different measured parameters (i.e. dose-response) was tested using a paired t-test, also with a null hypothesis of α=0.05.

Results

FIG. 8 summarizes by measurement type and dose group the PFT results and other physiological measurements. "Physical Measures" refers to body weight and lung weights; "Forced Maneuvers" are PFT results for anesthetized rats, "Spontaneous Breathing" are the WBP results, "Ventilation" are parameters from mechanical ventilation during imaging, and "Imaging" are results derived from the CT images at FRC and PIV. All measurements show the mean and σ from n=5 rats, except the previously noted 6 Gy group with n=4. In addition, the volume map of one rat in the 12 Gy group displayed a large anomalous ventilation defect in the right lung and was therefore eliminated from all volume map calculations. Significance levels, as compared to the control group, are indicated in the table. Of the measurements in FIG. 8, those that had a significant correlation with dose level were the dry lung weight (p=0.03, r=0.45) and the volume map CoV (p=0.013, r=−0.51). It should be noted that significant functional deteriorations were seen only in the 6 Gy group.

Figure 9A:
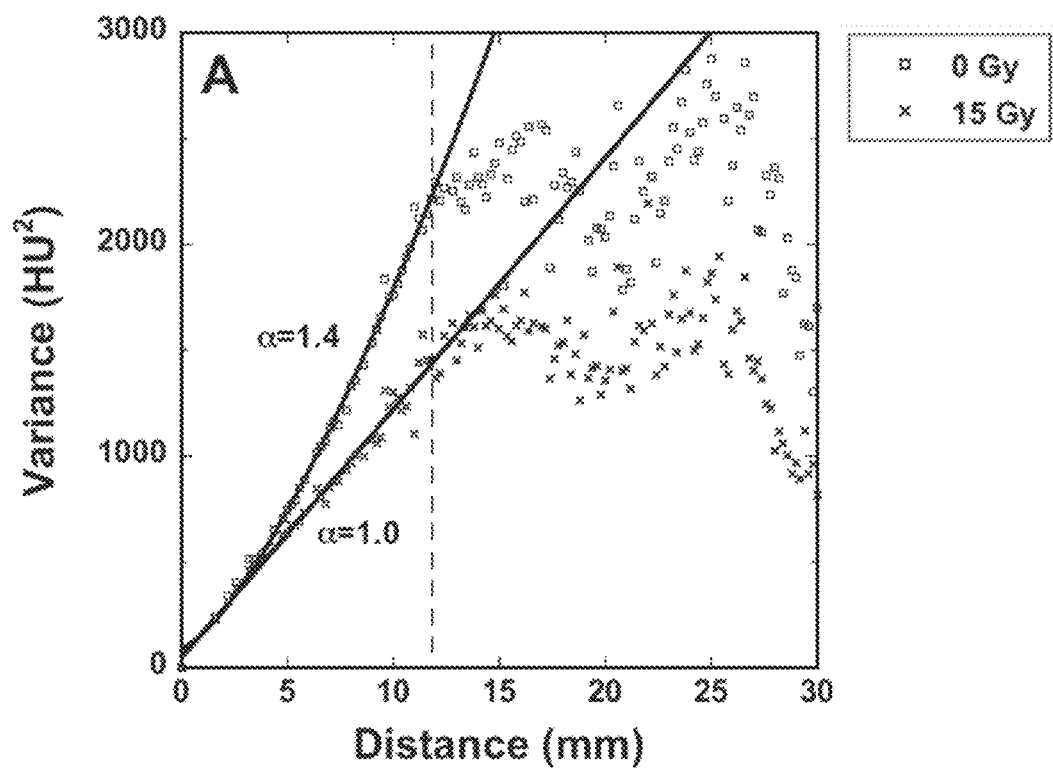
FIG. 9 shows variograms from 0— and 15-Gy rats showing the average HU variance of 8×8×8 cubes versus distance of separation (A) from computed tomography images at functional residual capacity and (B) volume maps.
Figure 9B:
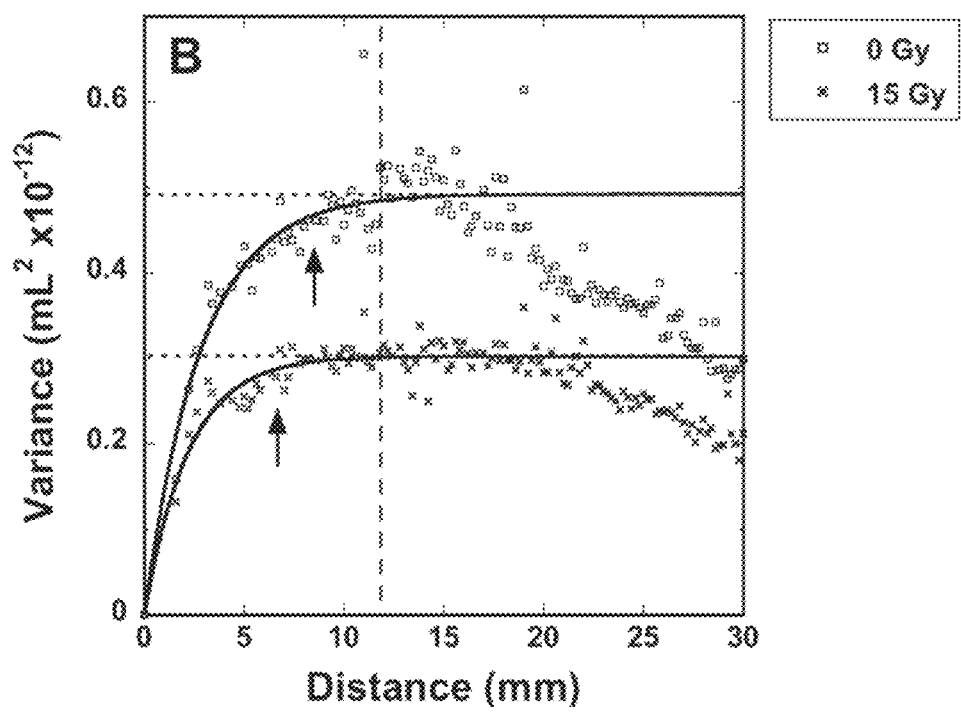

FIG. 9A shows representative variograms, made from the FRC images of two typical rats, one 0 Gy and one 15 Gy. The more rapid rise of the control variogram is indicative of comparatively greater variance at a given distance, which is interpreted as greater heterogeneity. FIG. 9B shows representative variograms from volume change maps.

Figure 10A:
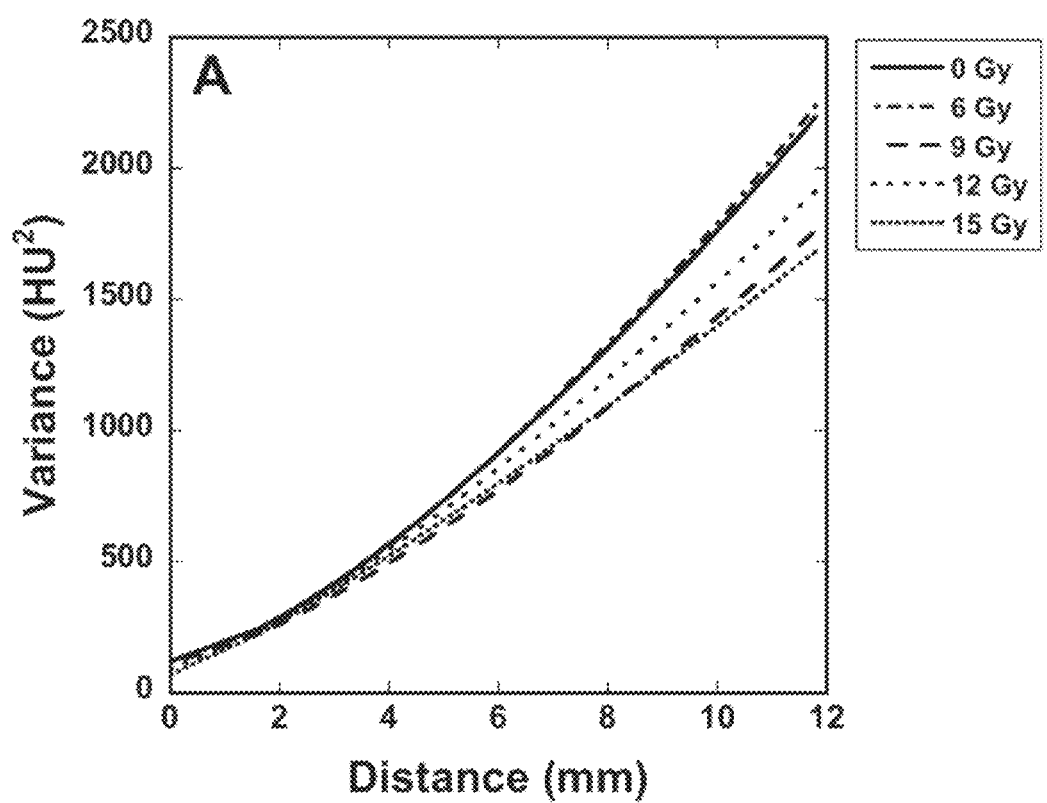
FIG. 10 shows reconstructed variograms based on the mean parameters of each dose group for the CT images at (A) functional residual capacity and (B) volume maps.
Figure 10B:
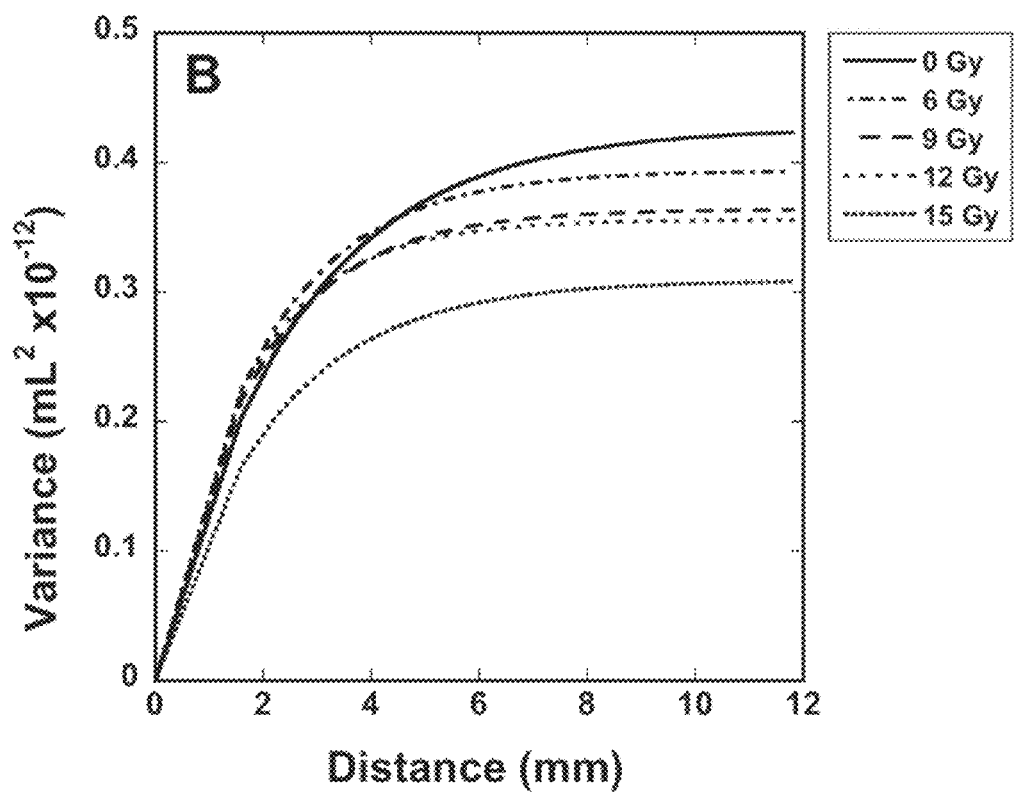

FIG. 10 shows reconstructed variograms based on the mean parameters of each dose group for the CT images at FRC (FIG. 10A) and the volume maps (FIG. 10B). Distinct differences between the 0 Gy and the 15 Gy groups are visible, with the other groups distributed in between. Also the presence of outliers influences the mean, resulting in some overlap between intermediate dose groups.

Figure 11A:
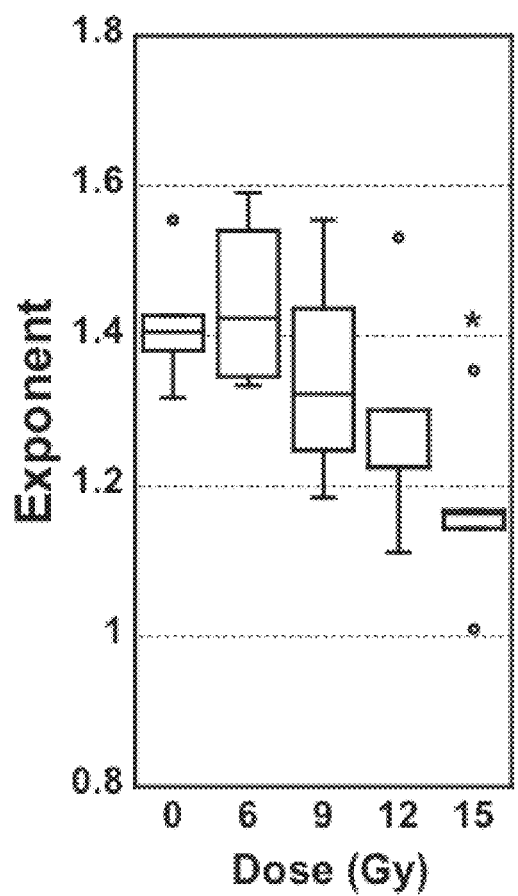
FIG. 11 shows box plots of variogram parameters versus dose of (A) the exponent α from the computed tomography images at functional residual capacity and (B) range (R) and still (S) from volume maps.
Figure 11B:
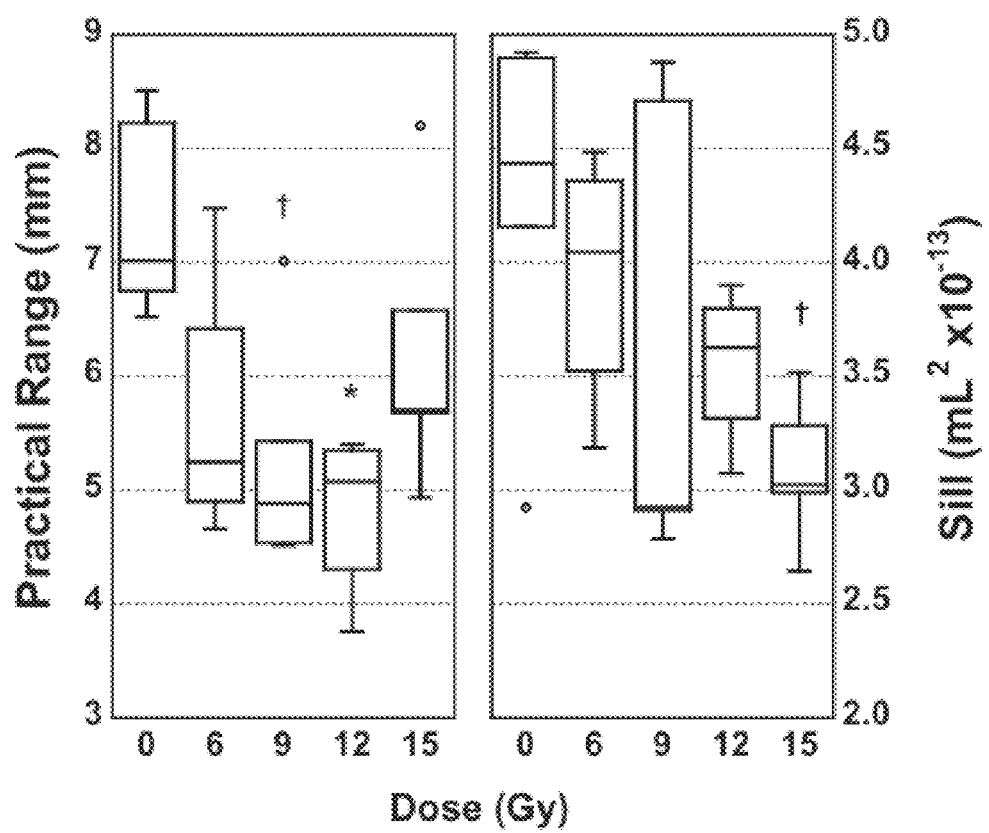

FIG. 11 shows box plots of the variogram parameters. In FIG. 11A, α at FRC becomes increasingly more distinct from the 0 Gy group with increasing dose to the point that the 15 Gy group is significantly different from control. Indeed, α correlates significantly with dose (p=0.003, r=−0.57). However, the correlation of dose with α is not significant at PIV (p=0.09, r=−0.35). For the volume change maps, S correlated significantly with dose (p=0.008, r=−0.53). However R showed different behavior, apparently varying with dose in a quadratic manner (see FIG. 11B).

Discussion

We have reported a rapid, objective method of lung CT image analysis that was better able to detect radiation-induced lung damage than conventional pulmonary function tests or image analysis techniques. In particular, variogram parameters from both the octree-decomposed CT images at FRC and the volume change maps correlated significantly with radiation dose. Results indicated that increased exposure to radiation was associated with reduced heterogeneity in this animal model, perhaps indicative of a widespread damage or repair response across the lung. We hesitate to speculate further about the nature of the reduced heterogeneity; however, this point may be elucidated by studies that incorporate blood and alveolar lavage fluid biomarkers as well as lung histological analysis.

Prior studies of radiation-induced lung damage in rats have focused on biomarker expression, DNA damage, non-invasive imaging, pulmonary function changes, and mechanical changes (Ward et al. 1993, Novakova-Jiresova et al. 2007, Wiegman et al. 2003, Vujaskovic t al. 1998, Van Erde et al. 2001, Zhang et al. 2008, Pauluhn et al. 2001, Calveley et al. 2005), often with a lack of consensus. An issue that complicates the body of research is the variety of animal models used, including rat strains, radiation doses, irradiated lung fractions, and elapsed time before data collection. Apparent discrepancies include whether there are significant changes to body weight, respiratory rate, collagen content, or CT density. For example, in this study HU did not correlate with dose, consistent with the findings of Wiegman et al. 2003, but contrary to the results of Vujaskovic et al. 1998. Both of these studies used male albino Wistar rats and employed hemithoracic or partial-lung irradiation. Pauluhn et al. 2001 measured significant differences in several physiological parameters between control and irradiated rats (e.g. body weight, lung volumes, etc.) using a hemithoracic exposure of 20 Gy in Fisher rats. In our study, we observed no significant differences between dose and control groups in most of the measurements made, indicating that the radiation damage was below the threshold of detection using these methods and group sizes.

The dose-response correlation in the variogram analysis detected at FRC was not detectable at PIV, suggesting that spatial variations in the lung decrease as the lung expands and fills with air. A decrease in a of the control group between FRC and PIV was found, which supports this hypothesis, since the lower exponent indicates a slower increase in spatial variation of the mean HU values. Thus, inflation results in a loss of information that masks the effects of subtle disease and potentially confounds diagnosis. Indeed, Kauczor et al. 2002 showed that the mean HU values in the human lung correlated better with several lung function parameters at expiration than at inspiration, also implying a loss of information in images acquired at inspiration.

The correlation with dose of volume change map parameters CoV and S implies that volume change maps may be useful diagnostic tools, in addition to their potential to characterize ventilation defects. However, such maps require multiple computational steps, and they demand the acquisition of 4DCT images at two different known inflation levels. The CT-based variograms, on the other hand, require only a single CT image, and α correlated as well or better with dose than S. These attributes make the CT approach more amenable to a clinical setting than the 4DCT approach.

A limitation of this study was the small numbers of animals in each group. Although a significant dose-response correlation was found from the variogram parameters, a clear separation of dose groups was not possible due to the range of response within each group; however, this could be also a consequence of closely-spaced dose levels.

The results suggest that variogram analysis of octree-decomposed CT images is a rapid, automated approach that may be highly sensitive to subtle lung damage or disease.

Example 3

Figure 12:
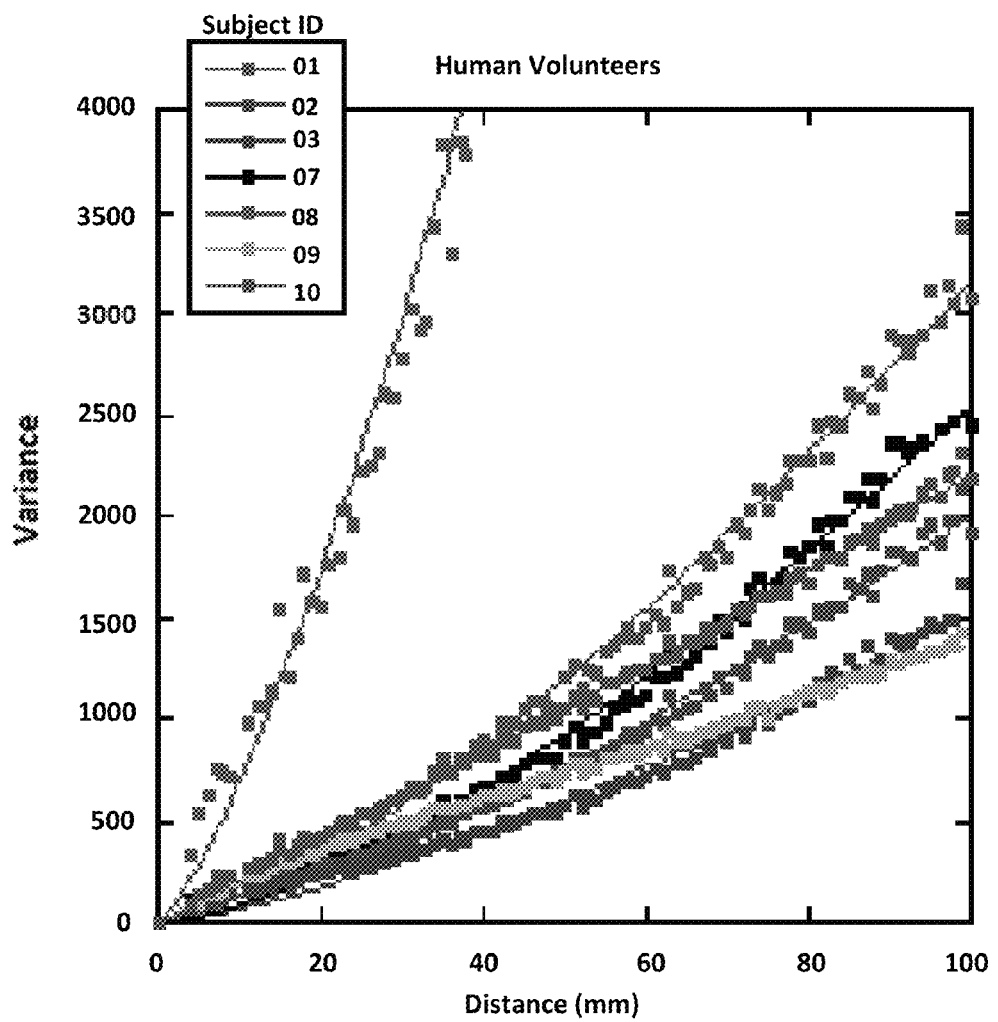
FIG. 12 shows variograms constructed from all the image sets, out to a distance of 100 mm.

In this third example we studied 3D CT images from five healthy volunteers and two diagnosed with mild emphysema. Pulmonary function tests were performed to confirm diagnosis. FIG. 12 shows variograms constructed from all the image sets, out to a distance of 100 mm. This is equivalent to $d_{max}$. Beyond this distance, changes in variance become random indicating no spatial relationships. The variogram data were fit to a standard power law equation of the form $y=m*x^a$, where m is the initial slope and a is the exponent describing curvature. For example, a>1 indicates that the line has upward curvature, a<1 indicates downward curvature, and a=1 is a straight line. As shown in the FIG. 12, the normal subjects (01-08) all have upward curvature (a>1), whereas the emphysematous subjects (09-10) have a≤1.

Figure 13:
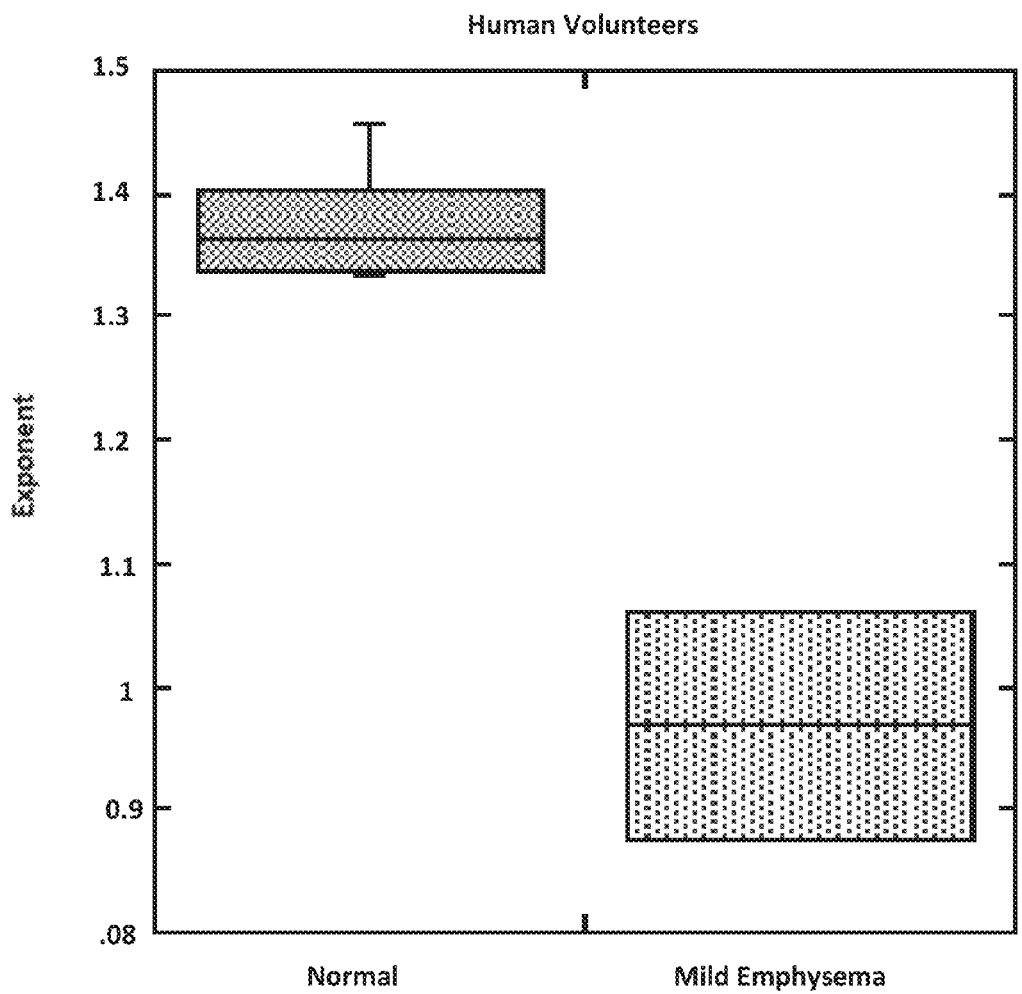
FIG. 13 is a box plot showing the group medians of the exponent α.

To better illustrate this point, FIG. 13 is a box plot showing the group medians of the exponent a. The clear separation of the normal subjects (upward curvature) from the emphysematous subjects (flat or downward curvature) suggests that the variogram is able to identify abnormalities present in human lung due to disease. Furthermore, it should be pointed out that in the FIG. 12 subject 08 appears to have a highly abnormal variogram, rising sharply with considerable separation from the other normal subjects. However, after fitting with the power fit equation, it was seen that a for this subject is consistent with the other normal subjects (evidenced in the FIG. 13 by the lack of outliers in the "normal" box plot), suggesting robustness of the variogram approach across subjects.

CONCLUSION

Results of this pre-clinical study of elastase-treated rats suggests that automated octree decomposition and variogram analysis based on image heterogeneity may provide a non-objective and sensitive metric for characterizing emphysematous lung and other diseases, even in early disease stages. The method outperformed conventional approaches that utilize thresholding and absolute HU values. This approach may be applicable to human datasets and other diseases.

REFERENCES

West J B: Pulmonary Pathophysiology, 5th edn. Philadelphia: Lippincott Williams & Wilkins; 1998.

Mets O M, de Jong P A, van Ginneken B, Gietema H A, Lammers J W: Quantitative computed tomography in COPD: possibilities and limitations. Lung 2012, 190(2): 133-145.

Robertson H T, Buxton R B: Imaging for lung physiology: what do we wish we could measure? J Appl Physiol 2012, 113(2):317-327.

Pauwels R A, Buist A S, Calverley P M, Jenkins C R, Hurd S S: Global strategy for the diagnosis, management, and prevention of chronic obstructive pulmonary disease. NHLBI/WHO Global Initiative for Chronic Obstructive Lung Disease (GOLD) Workshop summary. Am J Respir Crit Care Med 2001, 163(5):1256-1276.

Kohler D, Fischer J, Raschke F, Schonhofer B: Usefulness of GOLD classification of COPD severity. Thorax 2003, 58(9):825.

Pescarolo M, Sverzellati N, Verduri A, Chetta A, Marangio E, De Filippo M, Olivieri D, Zompatori M: How much do GOLD stages reflect CT abnormalities in COPD patients? Radiol Med 2008, 113(6):817-829.

Litmanovich D, Boiselle P M, Bankier A A: CT of pulmonary emphysema—current status, challenges, and future directions. Eur Radiol 2009, 19(3):537-551.

Chong D, Brown M S, Kim H J, van Rikxoort E M, Guzman L, McNitt-Gray M F, Khatonabadi M, Galperin-Aizenberg M, Coy H, Yang K et al: Reproducibility of volume and densitometric measures of emphysema on repeat computed tomography with an interval of 1 week. Eur Radiol 2012, 22(2):287-294.

Uppaluri R, Mitsa T, Sonka M, Hoffman E A, McLennan G: Quantification of pulmonary emphysema from lung computed tomography images. Am J Respir Crit. Care Med 1997, 156(1):248-254.

Besir F H, Mahmutyazicioglu K, Aydin L, Altin R, Asil K, Gundogdu S: The benefit of expiratory-phase quantitative CT densitometry in the early diagnosis of chronic obstructive pulmonary disease. Diagn Intery Radiol 2012, 18(3):248-254.

Irion K L, Marchiori E, Hochhegger B, Porto Nda S, Moreira Jda S, Anselmi C E, Holemans J A, Irion P O: CT quantification of emphysema in young subjects with no recognizable chest disease. AJR Am J Roentgenol 2009, 192(3):W90-96.

Reske A W, Busse H, Amato M B, Jaekel M, Kahn T, Schwarzkopf P, Schreiter D, Gottschaldt U, Seiwerts M: Image reconstruction affects computer tomographic assessment of lung hyperinflation. Intensive Care Med 2008, 34(11):2044-2053.

Yuan R, Mayo J R, Hogg J C, Pare P D, McWilliams A M, Lam S, Coxson H O: The effects of radiation dose and CT manufacturer on measurements of lung densitometry. Chest 2007, 132(2):617-623.

Chae E J, Seo J B, Song J W, Kim N, Park B W, Lee Y K, Oh Y M, Lee S D, Lim S Y: Slope of emphysema index: an objective descriptor of regional heterogeneity of emphysema and an independent determinant of pulmonary function. AJR Am J Roentgenol 2010, 194(3):W248-255.

Boehm H F, Fink C, Attenberger U, Becker C, Behr J, Reiser M: Automated classification of normal and pathologic pulmonary tissue by topological texture features extracted from multi-detector CT in 3D. Eur Radiol 2008, 18(12):2745-2755.

Xu Y, Sonka M, McLennan G, Guo J, Hoffman E A: MDCT-based 3-D texture classification of emphysema and early smoking related lung pathologies. IEEE Trans Med Imaging 2006, 25(4):464-475.

Hersh C P, Washko G R, Jacobson F L, Gill R, Estepar R S, Reilly J J, Silverman E K: Interobserver variability in the determination of upper lobe-predominant emphysema. Chest 2007, 131(2):424-431.

Mascalchi M, Diciotti S, Sverzellati N, Camiciottoli G, Ciccotosto C, Falaschi F, Zompatori M: Low agreement of visual rating for detailed quantification of pulmonary emphysema in whole-lung CT. Acta Radiol 2012, 53(1):53-60.

Fain S B, Panth S R, Evans M D, Wentland A L, Holmes J H, Korosec F R, O'Brien M J, Fountaine H, Grist T M: Early emphysematous changes in asymptomatic smokers: detection with 3He MR imaging. Radiology 2006, 239(3):875-883.

Quirk J D, Lutey B A, Gierada D S, Woods J C, Senior R M, Lefrak S S, Sukstanskii A L, Conradi M S, Yablonskiy D A: In vivo detection of acinar microstructural changes in early emphysema with (3)He lung morphometry. Radiology 2011, 260(3):866-874.

Alford S K, van Beek E J, McLennan G, Hoffman E A: Heterogeneity of pulmonary perfusion as a mechanistic image-based phenotype in emphysema susceptible smokers. Proc Natl Acad Sci USA 2010, 107(16):7485-7490.

Vidal Melo M F, Winkler T, Harris R S, Musch G, Greene R E, Venegas J G: Spatial heterogeneity of lung perfusion assessed with (13)N PET as a vascular biomarker in chronic obstructive pulmonary disease. J Nucl Med 2010, 51(1):57-65.

Vogt B, Pulletz S, Elke G, Zhao Z, Zabel P, Weiler N, Frerichs I: Spatial and temporal heterogeneity of regional lung ventilation determined by electrical impedance tomography during pulmonary function testing. J Appl Physiol 2012, 113(7):1154-1161.

Chen C C, Daponte J S, Fox M D: Fractal feature analysis and classification in medical imaging. IEEE Trans Med Imaging 1989, 8(2):133-142.

Glenny R W, Robertson H T: Fractal properties of pulmonary blood flow: characterization of spatial heterogeneity. J Appl Physiol 1990, 69(2):532-545.

Copley S J, Giannarou S, Schmid V J, Hansell D M, Wells A U, Yang G Z: Effect of Aging on Lung Structure In Vivo: Assessment With Densitometric and Fractal Analysis of High-resolution Computed Tomography Data. J Thorac Imaging 2012, 27(6):366-371.

Kido S, Ikezoe J, Naito H, Tamura S, Machi S: Fractal analysis of interstitial lung abnormalities in chest radiography. Radiographics 1995, 15(6):1457-1464.

Uppaluri R, Mitsa T, Galvin J R: Fractal analysis of high-resolution CT images as a tool for quantification of lung disease. In: Medical Imaging 1995: Physiology and Function from Multidimensional Images. Volume 2433, edn. Edited by Hoffman E A. Bellingham, Wash.: SPIE; 1995: 133-142.

Kido S, Sasaki S: Fractal analysis for quantitative evaluation of diffuse lung abnormalities on chest radiographs: use of sub-ROIs. J Thorac Imaging 2003, 18(4):237-241.

Subramaniam K, Hoffman E A, Tawhai M H: Quantifying Tissue Heterogeneity using Quadtree Decomposition. In: 34th Annual International Conference of the IEEE EMBS. San Diego, Calif., USA; 2012: 4079-4082.

Shephard M S, Georges M K: Automatic 3-Dimensional Mesh Generation by the Finite Octree Technique. Int J Numer Meth Eng 1991, 32(4):709-749.

Zhang J H, Owen C B: Octree-based animated geometry compression. Comput Graph-Uk 2007, 31(3):463-479.

Szeliski R, Lavallee S: Matching 3-D anatomical surfaces with non-rigid deformations using octree-splines. Int J Comput Vision 1996, 18(2):171-186.

Zhang Y J, Bajaj C, Sohn B S: 3D finite element meshing from imaging data. Comput Method Appl M 2005, 194 (48-49):5083-5106.

Dua S, Kandiraju N, Chowriappa P: Region quad-tree decomposition based edge detection for medical images. Open Med Inform J 2010, 4:50-57.

Clark I, Harper W V: Practical Geostatistics 2000. Columbus, Ohio: Ecosse North America, LLC; 2000.

Gringarten E, Deutsch C V: Variogram interpretation and modeling. Math Geol 2001, 33(4):507-534.

Keil F, Oros-Peusquens A M, Shah N J: Investigation of the spatial correlation in human white matter and the influence of age using 3-dimensional variography applied to MP-RAGE data. Neuroimage 2012, 63(3):1374-1383.

Jacob R E, Minard K R, Laicher G, Timchalk C: 3D 3He diffusion MRI as a local in vivo morphometric tool to evaluate emphysematous rat lungs. J Appl Physiol 2008, 105(4):1291-1300.

Jacob R E, Lamm W J: Stable small animal ventilation for dynamic lung imaging to support computational fluid dynamics models. PLoS One 2011, 6(11):e27577.

Corley R A, Kabilan S, Kuprat A P, Carson J P, Minard K R, Jacob R E, Timchalk C, Glenny R, Pipavath S, Cox T et al: Comparative computational modeling of airflows and vapor dosimetry in the respiratory tracts of rat, monkey, and human. Toxicol Sci 2012, 128(2):500-516.

Minard K R, Kuprat A P, Kabilan S, Jacob R E, Einstein D R, Carson J P, Corley R A: Phase-contrast MRI and CFD modeling of apparent (3)He gas flow in rat pulmonary airways. J Magn Reson 2012, 221:129-138.

ImageJ [http://imagej.nih.gov/ij/]

ImageJ Plugins: 3D Toolkit [http://ij-plugins.sourceforge.net/plugins/3d-toolkit/index.html]

Jackins C L, Tanimoto S L: Oct-trees and their use in representing three dimensional objects. Computer Graphics and Image Processing 1980, 14(3):249-270.

Schulz H, Mühle H: Respiration. In: The Laboratory Rat. edn. Edited by Krinke G J. San Diego: Academic Press; 2000: 323-336.

Spencer H: Pathology of the Lung. In. Volume 1, 4th edn. New York: Pergamon Press; 1985: 557-594.

Bohling G C: Introduction to Geostatistics. In.: Kansas Geological Survey Open File Report no. 2007-26, 50 pp.; 2007.

Hsia C C, Hyde D M, Ochs M, Weibel E R: An official research policy statement of the American Thoracic Society/European Respiratory Society: standards for quantitative assessment of lung structure. Am J Respir Crit Care Med 2010, 181(4):394-418.

Jacob R E, Carson J P, Gideon K M, Amidan B G, Smith C L, Lee K M: Comparison of two quantitative methods of discerning airspace enlargement in smoke-exposed mice. PLoS One 2009, 4(8):e6670.

Lynch D A, Travis W D, Muller N L, et al. Idiopathic interstitial pneumonias: CT features. Radiology 2005; 236:10-21.

Lehnert S, el-Khatib E. The use of CT densitometry in the assessment of radiation-induced damage to the rat lung: a comparison with other endpoints. Int J Radiat Oncol Biol Phys 1989; 16:117-124.

Ward E R, Hedlund L W, Kurylo W C, et al. Proton and hyperpolarized helium magnetic resonance imaging of radiation-induced lung injury in rats. Int J Radiat Oncol Biol Phys 2004; 58:1562-1569.

Ward H E, Kemsley L, Davies L, et al. The pulmonary response to sublethal thoracic irradiation in the rat. Radiat Res 1993; 136:15-21.

Quantitative Concepts and dosimetry in radiobiology: Report 30: International Commission on Radiation Units (ICRU); 1979. pp. 13-14.

Novakova-Jiresova A, van Luijk P, van Goor H, et al. Changes in expression of injury after irradiation of increasing volumes in rat lung. Int J Radiat Oncol Biol Phys 2007; 67:1510-1518.

Rasband W S. ImageJ U.S. National Institutes of Health. http://imagej.nih.gov/ij/.

Sacha J. ImageJ Plugins: 3D Toolkit http://ij-plugins.sourceforge.net/plugins/3d-toolkit/index.html.

Jacob R E, Carson J P, Thomas M, et al. Dynamic Multiscale Boundary Conditions for 4D CT of Healthy and Emphysematous Rats PLoS One 2013; 8:e65874.

Yin Y. MDCT-based dynamic, subject-specific lung models via image registration for CFD-based interrogation of regional lung function. Mechanical Engineering. Vol Ph.D. Iowa City, Iowa: University of Iowa; 2011.

Wiegman E M, Meertens H, Konings A W, et al. Locoregional differences in pulmonary function and density after partial rat lung irradiation. Radiother Oncol 2003; 69:11-19.

Vujaskovic Z, Down J D, van t'Veld A A, et al. Radiological and functional assessment of radiation-induced lung injury in the rat. Exp Lung Res 1998; 24:137-148.

van Eerde M R, Kampinga H H, Szabo B G, et al. Comparison of three rat strains for development of radiation-induced lung injury after hemithoracic irradiation. Radiother Oncol 2001; 58:313-316.

Zhang R, Ghosh S N, Zhu D, et al. Structural and functional alterations in the rat lung following whole thoracic irradiation with moderate doses: injury and recovery. Int J Radiat Biol 2008; 84:487-497.

Pauluhn J, Baumann M, Hirth-Dietrich C, et al. Rat model of lung fibrosis: comparison of functional, biochemical, and histopathological changes 4 months after single irradiation of the right hemithorax. Toxicology 2001; 161: 153-163.

Calveley V L, Khan M A, Yeung I W, et al. Partial volume rat lung irradiation: temporal fluctuations of in-field and out-of-field DNA damage and inflammatory cytokines following irradiation. Int J Radiat Biol 2005; 81:887-899.

Kauczor H U, Hast J, Heussel C P, et al. CT attenuation of paired HRCT scans obtained at full inspiratory/expiratory position: comparison with pulmonary function tests. Eur Radiol 2002; 12:2757-2763.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

We claim:

1. A method of assessing heterogeneity in images comprising:
   a. acquiring 3D images of a biological tissue;
   b. performing iterative decomposition on the acquired images;
   c. performing comparative analysis of the decomposed images using distance, which includes graphically representing spatial relationships between regions of the images that are relatively homogeneous, wherein diseased biological tissue is distinguished from healthy biological tissue; and
   d. masking the images;
   wherein the performing iterative decomposition on the acquired images includes performing octree decomposition on the masked images and reducing the images to obtain image subdivisions that are relatively homogeneous, and wherein the reducing includes dividing boxes of the images according to a criterion which includes a measurement of standard deviation within each box and comparison of the standard deviation to a threshold standard.

2. The method of claim 1 further comprising filtering the acquired images.

3. The method of claim 1 wherein each box includes location and mean value information.

4. The method of claim 1 wherein the performing comparative analysis of the decomposed images using distance comprises performing variogram analysis of the decomposed images.

5. The method of claim 4 wherein the performing variogram analysis comprises calculating a square of the difference of the means between each box.

6. The method of claim 5 wherein each box is an 8×8×8 voxel box.

7. The method of claim 1 wherein the images are reduced to homogeneous blocks of 2×2×2, 4×4×4, and 8×8×8 voxels.

8. The method of claim 1 wherein the threshold standard includes a Hounsfield Unit (HU) threshold.

9. The method of claim 1 wherein the images are at least one of the following: CT images, multi-dimensional images, ultrasound images, MRI images, data arrays, data matrix, data sets, pictures, multi-spectral images, and voxels of data generated using histograms.

10. The method of claim 1 wherein the performing comparative analysis of the decomposed images using distance comprises performing correlogram analysis of the decomposed images.

11. A method of assessing heterogeneity in images comprising:
   a. acquiring 3D images of a biological tissue;
   b. filtering the acquired images;
   c. masking the images;
   d. performing octree decomposition on the masked images and reducing the images to obtain image subdivisions that are relatively homogeneous, wherein the reducing includes dividing boxes of the images according to a criterion which includes a measurement of standard deviation within each box and comparison of the standard deviation to a threshold standard; and
   e. performing variogram analysis or correlogram analysis of the octree decomposed images to graphically represent and determine spatial relationships between regions of the images that are relatively homogeneous, wherein diseased biological tissue is distinguished from healthy biological tissue.

12. The method of claim 11 wherein the images are at least one of the following: CT images, multi-dimensional images, ultrasound images, MRI images, data arrays, data matrix, data sets, pictures, multi-spectral images, and voxels of data generated using histograms.

* * * * *